(12) United States Patent
Keys et al.

(10) Patent No.: US 10,013,684 B2
(45) Date of Patent: Jul. 3, 2018

(54) PROCESSING CARDLESS TRANSACTIONS AT AUTOMATED TELLER DEVICES

(71) Applicant: Bank of America Corporation, Charlotte, NC (US)

(72) Inventors: Andrew T. Keys, Albany, OR (US); Raghav Shenoy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 451 days.

(21) Appl. No.: 14/728,403

(22) Filed: Jun. 2, 2015

(65) Prior Publication Data

US 2016/0358139 A1 Dec. 8, 2016

(51) Int. Cl.
| | |
|---|---|
| *G06Q 40/00* | (2012.01) |
| *G06Q 20/10* | (2012.01) |
| *G06Q 20/32* | (2012.01) |
| *G06Q 20/38* | (2012.01) |

(52) U.S. Cl.
CPC ..... *G06Q 20/1085* (2013.01); *G06Q 20/3223* (2013.01); *G06Q 20/385* (2013.01); *G06Q 20/3821* (2013.01)

(58) Field of Classification Search
CPC .................................................. G06Q 20/1085
USPC .......................................... 726/5, 7; 705/43
See application file for complete search history.

(56) References Cited

U.S. PATENT DOCUMENTS

| | | | |
|---|---|---|---|
| 2007/0050840 A1* | 3/2007 | Grandcolas | G06F 21/42 726/5 |
| 2009/0300745 A1* | 12/2009 | Dispensa | H04L 63/0869 726/7 |
| 2010/0145852 A1* | 6/2010 | Morson | G06Q 20/1085 705/43 |
| 2014/0325646 A1 | 10/2014 | Turgeman et al. | |
| 2014/0325682 A1 | 10/2014 | Turgeman et al. | |
| 2014/0337227 A1 | 11/2014 | Dua | |
| 2014/0337243 A1 | 11/2014 | Dutt et al. | |
| 2014/0337957 A1 | 11/2014 | Feekes | |
| 2014/0344891 A1 | 11/2014 | Mullick et al. | |
| 2014/0344927 A1 | 11/2014 | Turgeman et al. | |
| 2014/0351911 A1 | 11/2014 | Yang et al. | |
| 2015/0006405 A1 | 1/2015 | Palmer et al. | |
| 2015/0006627 A1 | 1/2015 | Palmeri et al. | |

(Continued)

*Primary Examiner* — Samica L Norman
(74) *Attorney, Agent, or Firm* — Banner & Witcoff, Ltd.; Michael A. Springs

(57) ABSTRACT

Methods, systems, and computer-readable media for processing cardless transactions at automated teller devices are presented. In some embodiments, a computer system may receive, from an automated teller device associated with a financial institution, login input comprising one or more online banking credentials associated with a customer of the financial institution. Subsequently, the computer system may validate the login input. If the login input is valid, the computer system may generate a one-time passcode. Then, the computer system may send, to a customer mobile device associated with the customer, the one-time passcode. Thereafter, the computer system may receive, from the automated teller device, passcode input. Subsequently, the computer system may validate the passcode input. If the passcode input is valid, the computer system may generate a customer authentication message. Then, the computer system may send, to the automated teller device, the customer authentication message.

17 Claims, 16 Drawing Sheets

(56) References Cited

U.S. PATENT DOCUMENTS

| | | |
|---|---|---|
| 2015/0011298 A1 | 1/2015 | Haid et al. |
| 2015/0012426 A1 | 1/2015 | Purves et al. |
| 2015/0012430 A1 | 1/2015 | Chisholm et al. |
| 2015/0019944 A1 | 1/2015 | Kalgi |
| 2015/0026049 A1 | 1/2015 | Theurer et al. |
| 2015/0026055 A1 | 1/2015 | Calman et al. |
| 2015/0058227 A1 | 2/2015 | Dua |
| 2015/0058931 A1 | 2/2015 | Miu et al. |
| 2015/0058950 A1 | 2/2015 | Miu |
| 2015/0059003 A1 | 2/2015 | Bouse |
| 2015/0067823 A1 | 3/2015 | Chatterton |
| 2015/0068069 A1 | 3/2015 | Tran et al. |
| 2015/0073907 A1 | 3/2015 | Purves et al. |
| 2015/0073987 A1 | 3/2015 | Dutt |
| 2015/0073992 A1 | 3/2015 | Weiner et al. |
| 2015/0074774 A1 | 3/2015 | Nema et al. |
| 2015/0077228 A1 | 3/2015 | Dua |
| 2015/0081559 A1 | 3/2015 | Dua |
| 2015/0088750 A1 | 3/2015 | Dua |
| 2015/0088754 A1 | 3/2015 | Kirsch |
| 2015/0088758 A1 | 3/2015 | Varadarajan et al. |
| 2015/0088760 A1 | 3/2015 | Meurs |
| 2015/0089222 A1 | 3/2015 | White et al. |
| 2015/0089497 A1 | 3/2015 | Borzycki et al. |
| 2015/0089613 A1 | 3/2015 | Tippett et al. |
| 2015/0095174 A1 | 4/2015 | Dua |
| 2015/0095175 A1 | 4/2015 | Dua |
| 2015/0095235 A1 | 4/2015 | Dua |
| 2015/0099941 A1 | 4/2015 | Tran |
| 2015/0100488 A1 | 4/2015 | Dua |
| 2015/0100499 A1 | 4/2015 | Dua |
| 2015/0105043 A1 | 4/2015 | Puvvula et al. |
| 2015/0105631 A1 | 4/2015 | Tran et al. |
| 2015/0106287 A1 | 4/2015 | Holman et al. |
| 2015/0106288 A1 | 4/2015 | Holman et al. |
| 2015/0113172 A1 | 4/2015 | Johnson et al. |
| 2015/0113608 A1 | 4/2015 | Chermside |
| 2015/0125832 A1 | 5/2015 | Tran |
| 2015/0143490 A1 | 5/2015 | Fang |
| 2015/0143496 A1 | 5/2015 | Thomas et al. |

\* cited by examiner

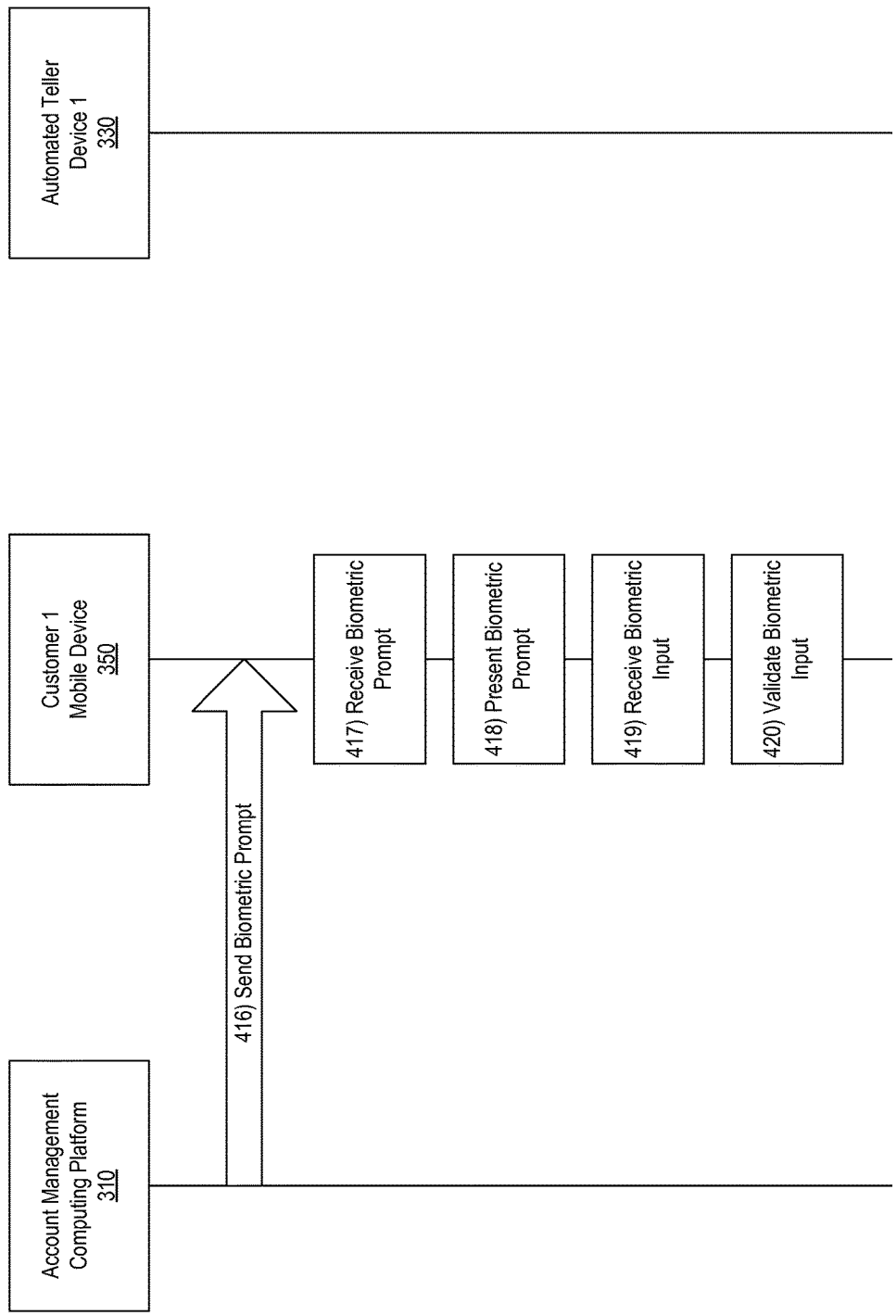

PROCESSING CARDLESS TRANSACTIONS AT AUTOMATED TELLER DEVICES

BACKGROUND

Aspects of the disclosure relate to computer hardware and software. In particular, one or more aspects of the disclosure generally relate to computer hardware and software for processing cardless transactions at automated teller devices.

Large organizations, such as financial institutions, may serve many customers, and such customers continue demand more convenient and functional ways of interacting with such organizations. For example, customers of financial institutions continue to demand more convenient and functional ways of viewing their financial account information, conducting transactions, and/or otherwise accessing their financial accounts that may be maintained by their financial institutions.

As financial institutions provide customers with new, convenient, and functional ways of accessing their financial accounts, and as customers increasingly take advantage of these options, it may be increasingly important to ensure the safety and security of customer information, financial account information, and/or other information that may be made more accessible. In many instances, however, it may be difficult to provide customers and/or other authorized users with efficient, easy to use, and convenient access to financial accounts, while also ensuring the security of such financial accounts and/or the information that may be associated with such financial accounts and pursuing ever greater levels of security for such accounts and/or information.

SUMMARY

Aspects of the disclosure relate to various systems and techniques that provide effective, efficient, scalable, and convenient ways of securely providing access to financial accounts and financial account information, particularly in ways that involve providing such access at automated teller devices.

For example, one way in which customers of financial institutions may access their account information is via automated teller devices, such as automated teller machines (ATMs) and automated teller assistants (ATAs). Automated teller machines may be fully automated devices that enable customers of a financial institution to view their account balance information, deposit checks and/or cash into their financial accounts, withdraw funds from their financial accounts, transfer funds between financial accounts, and/or utilize other functions that may be available and/or enabled by their financial institution. Automated teller assistants may provide similar functionality as automated teller machines and may further provide teleconferencing functionality that may enable a customer of a financial institution to video chat with a bank teller (who may, e.g., be located in a customer service center remote from the automated teller assistant).

Typically, to access an automated teller device, a customer of a financial institution may be required to provide a physical banking card or other physical token, as well as a personal identification number (PIN) and/or other credentials. In some instances, however, a customer of a financial institution may wish to access and/or use an automated teller device without providing these credentials, for instance, if the customer's physical banking card has been lost or stolen.

By implementing one or more aspects of the disclosure, one or more of these and/or other issues may be overcome. For example, in accordance with one or more aspects of the disclosure, a customer of a financial institution may be able to access an automated teller device without a physical banking card or other physical token by instead providing his or her online banking credentials, such as an online banking username, password, one-time passcode, one or more biometrics, and/or the like. Because the customer of the financial institution might not have a physical token, the financial institution and/or the automated teller device may provide the customer with only limited access to certain functions, for instance, by preventing the customer from making certain types of withdrawals and/or other transactions. But the financial institution and/or the automated teller device nevertheless may enable the customer to request and/or may process other types of transactions, for instance, by allowing the customer to make deposits, view balance information, and/or make limited withdrawals.

In addition, the financial institution and/or the automated teller device may enable the customer of the financial institution to report their physical banking card as lost or stolen, which may cause the financial institution to place one or more holds on one or more financial accounts of the customer to prevent further transactions from being requested or processed. In some instances, when a customer is reporting their banking card as being lost or stolen, the automated teller device also may allow the customer to make an emergency withdrawal, which may be capped at a predetermined amount, for instance, to hold the customer over until they are able to receive a new banking card from the financial institution.

Advantageously, one or more aspects of the disclosure may enable customers of financial institutions to use their online banking credentials to more conveniently, securely, efficiently, and effectively access automated teller devices, even in instances in which a particular customer of a particular financial institution might not have a physical banking card or other physical credential that might otherwise be needed to access a particular automated teller device.

In accordance with one or more embodiments, an account management computing platform having at least one processor, a memory, and a communication interface may receive, via the communication interface, and from an automated teller device associated with a financial institution, login input comprising one or more online banking credentials associated with a customer of the financial institution. Subsequently, the account management computing platform may validate the login input comprising the one or more online banking credentials associated with the customer of the financial institution. If the login input comprising the one or more online banking credentials associated with the customer of the financial institution is valid, the account management computing platform may generate a one-time passcode. Then, the account management computing platform may send, via the communication interface, and to a customer mobile device associated with the customer of the financial institution, the one-time passcode. Thereafter, the account management computing platform may receive, via the communication interface, and from the automated teller device associated with the financial institution, passcode input. Subsequently, the account management computing platform may validate the passcode input. If the passcode input is valid, the account management computing platform may generate a customer authentication message configured to cause the automated teller device associated with the financial institution to present one or more automated teller user interfaces to a user of the automated teller device associated with the financial institution. Then, the account management computing platform may send, via the communication interface, and to the automated teller device associated with the financial institution, the customer authentication message.

In some embodiments, if the login input comprising the one or more online banking credentials associated with the customer of the financial institution is not valid, the account management computing platform may send, via the communication interface, and to the automated teller device associated with the financial institution, an error message.

In some embodiments, if the passcode input is not valid, the account management computing platform may send, via the communication interface, and to the automated teller device associated with the financial institution, an error message.

In some embodiments, the automated teller device associated with the financial institution may be an automated teller machine. In some embodiments, the automated teller device associated with the financial institution may be an automated teller assistant.

In some embodiments, the one or more automated teller user interfaces may be configured to provide limited access to one or more financial accounts of the customer of the financial institution.

In some embodiments, the customer authentication message may be configured to cause the automated teller device associated with the financial institution to present the one or more automated teller user interfaces to the user of the automated teller device associated with the financial institution irrespective of the automated teller device associated with the financial institution receiving a physical banking card from the user of the automated teller device associated with the financial institution.

In some embodiments, the customer authentication message may be configured to cause the automated teller device associated with the financial institution to present the one or more automated teller user interfaces to the user of the automated teller device associated with the financial institution irrespective of the automated teller device associated with the financial institution receiving a personal identification number (PIN) from the user of the automated teller device associated with the financial institution.

In some embodiments, if the passcode input is valid, and prior to generating the customer authentication message configured to cause the automated teller device associated with the financial institution to present the one or more automated teller user interfaces to the user of the automated teller device associated with the financial institution, the account management computing platform may generate a biometric authentication prompt. Subsequently, the account management computing platform may send, via the communication interface, and to the customer mobile device associated with the customer of the financial institution, the biometric authentication prompt. Thereafter, the account management computing platform may receive, via the communication interface, and from the customer mobile device associated with the customer of the financial institution, a biometric authentication message indicating that a user of the customer mobile device associated with the customer of the financial institution has been biometrically authenticated.

In some embodiments, after sending the customer authentication message, the account management computing platform may receive, via the communication interface, and from the automated teller device associated with the financial institution, lost-card input indicating that a physical banking card associated with the customer of the financial institution is lost or stolen. Based on receiving the lost-card input indicating that the physical banking card associated with the customer of the financial institution is lost or stolen, the account management computing platform may update one or more account records associated with the customer of the financial institution to place one or more holds on one or more accounts associated with the customer of the financial institution.

In some embodiments, after receiving the lost-card input indicating that the physical banking card associated with the customer of the financial institution is lost or stolen, the account management computing platform may generate a customer assistance message configured to cause the automated teller device associated with the financial institution to present one or more customer assistance user interfaces to the user of the automated teller device associated with the financial institution. Subsequently, the account management computing platform may send, via the communication interface, and to the automated teller device associated with the financial institution, the customer assistance message.

In some embodiments, the customer assistance message may be configured to cause the automated teller device associated with the financial institution to present, to the user of the automated teller device associated with the financial institution, at least one customer assistance user interface comprising one or more directions from the automated teller device associated with the financial institution to a banking center associated with the financial institution.

In some embodiments, the customer assistance message may be configured to cause the automated teller device associated with the financial institution to present, to the user of the automated teller device associated with the financial institution, at least one customer assistance user interface comprising at least one option to request an emergency withdrawal.

In some embodiments, after sending the customer assistance message, the account management computing platform may receive, via the communication interface, and from the automated teller device associated with the financial institution, an emergency withdrawal message comprising a request to make an emergency withdrawal from the automated teller device associated with the financial institution. Subsequently, the account management computing platform may calculate an emergency withdrawal amount. Then, the account management computing platform may send, via the communication interface, and to the automated teller device associated with the financial institution, a withdrawal amount message configured to cause the automated teller device associated with the financial institution to dispense funds up to the emergency withdrawal amount.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4I depict an illustrative event sequence for processing cardless transactions at automated teller devices in accordance with one or more example embodiments;

DETAILED DESCRIPTION

Aspects of the disclosure relate to processing cardless transactions at automated teller devices. In accordance with one or more example embodiments, which are illustrated in greater detail below, a customer of a financial institution may approach an automated teller device, such as an ATM, and may be authenticated without their debit card, perhaps because the customer's debit card has been lost or stolen. In some instances, the customer may be authenticated at the ATM using their online banking credentials. Additionally or alternatively, the customer may be authenticated using their mobile device (e.g., using a one-time passcode, using a fingerprint biometric input prompt, or the like). After authenticating the customer, the ATM may provide limited access to the customer's accounts. For example, the customer may be able to withdraw a predetermined amount of money (e.g., capped at a certain amount, such as $100 or $500, or capped at a percentage, such as 5% of account balance or 10% of account balance). Additionally or alternatively, the ATM may allow the customer to report their debit card as being lost or stolen (e.g., to disable additional transactions from being performed with the debit card). Additionally or alternatively, the ATM may provide instructions to the customer for assistance (e.g., by providing directions to and/or hours information for a nearby banking center; by allowing the customer to make an appointment at a nearby banking center to receive a temporary card; or the like). After the customer's account has been disabled, certain types of transactions may be permitted to continue, such as online banking transfer transactions and bill pay transactions. Other types of transactions may be prevented until the customer activates a new debit card or re-enables their previous debit card (e.g., if the customer is able to find it after all).

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
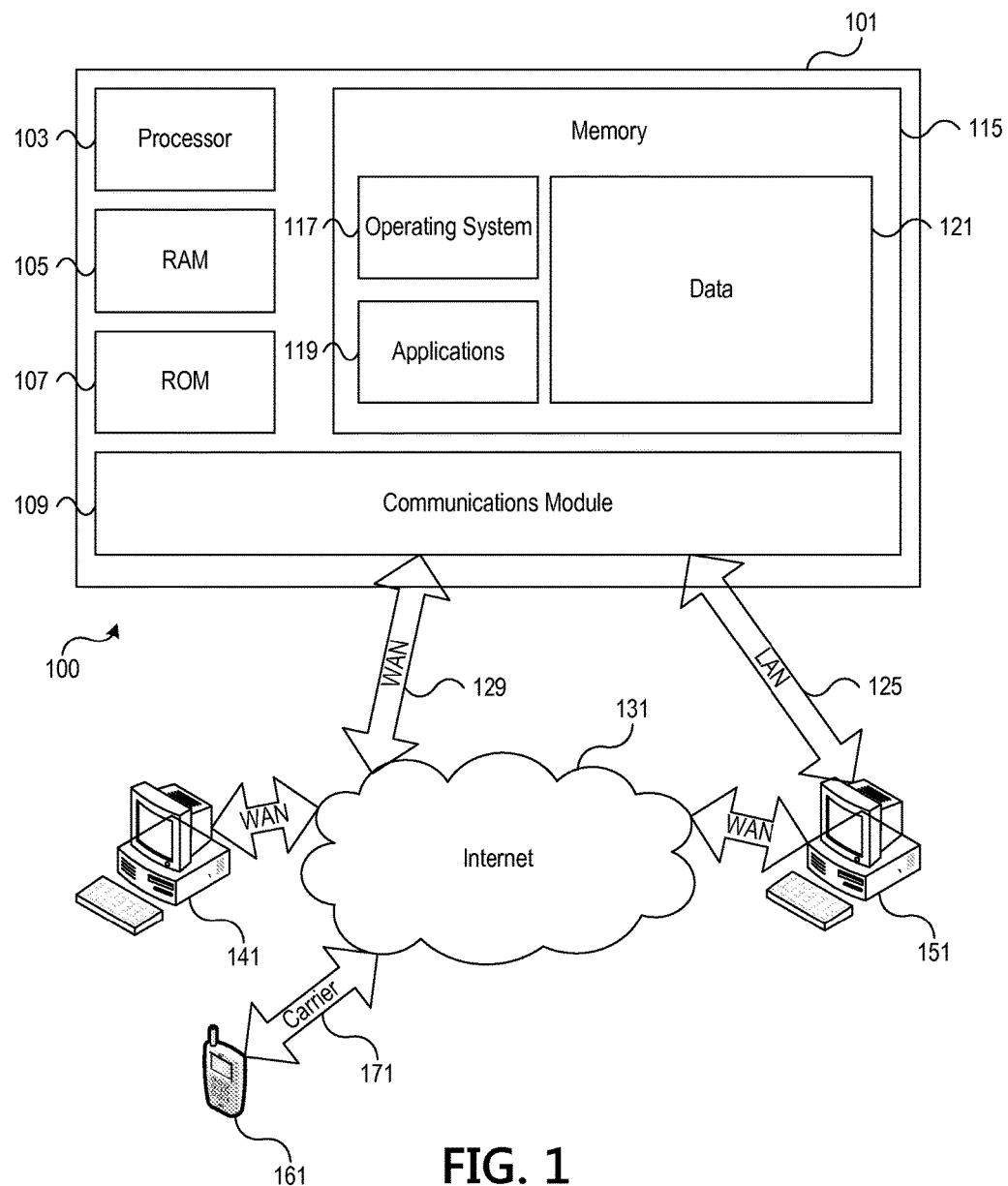
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
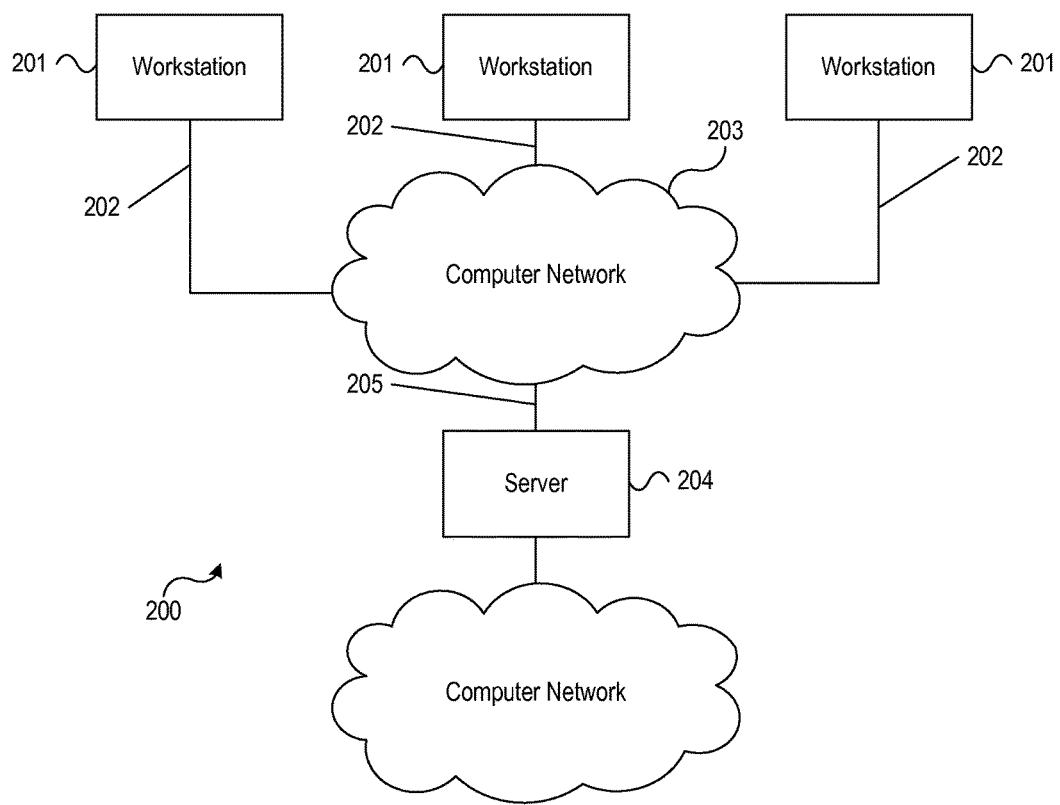
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
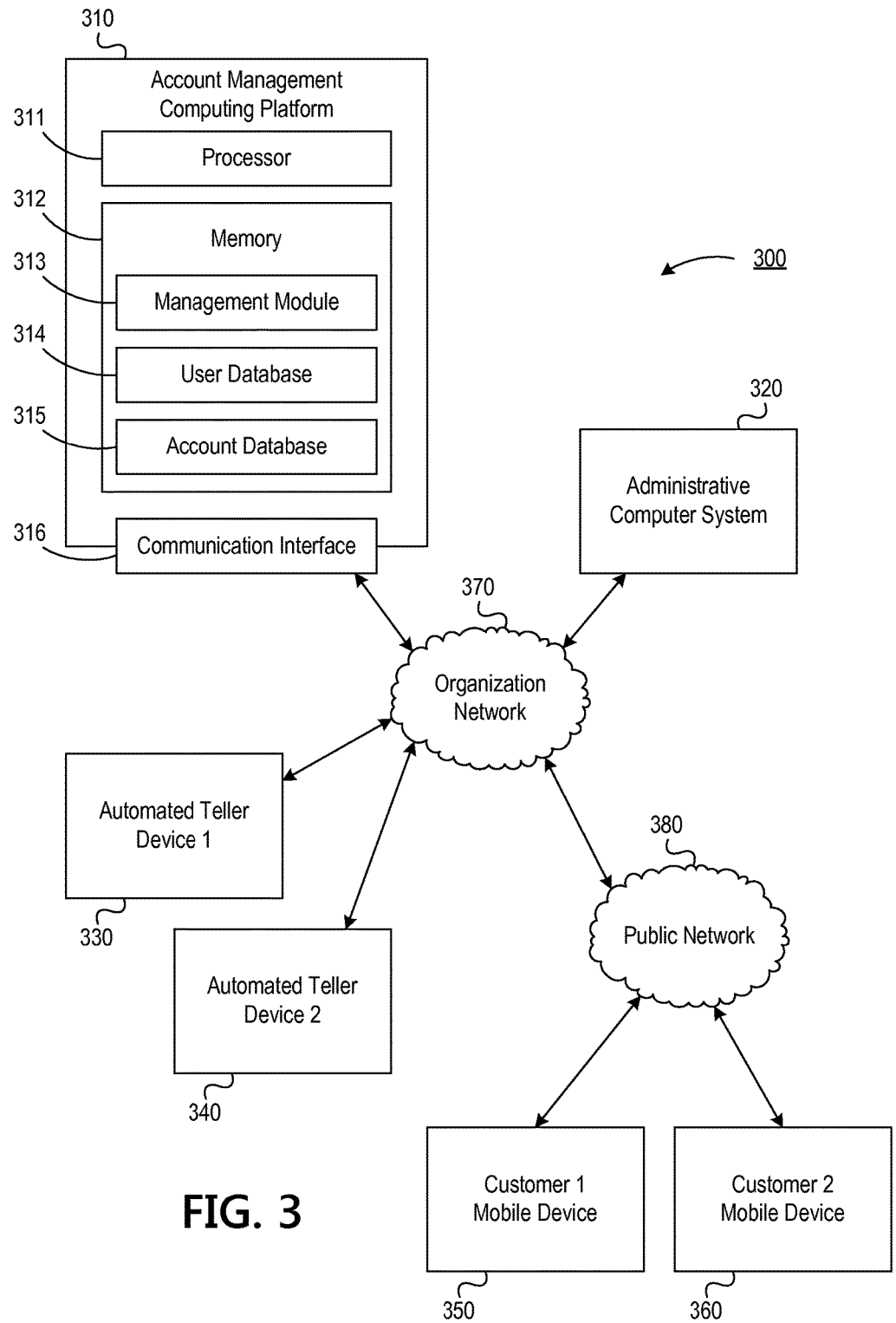
FIG. 3 depicts an illustrative computing environment for processing cardless transactions at automated teller devices in accordance with one or more example embodiments.

FIG. 3 depicts an illustrative computing environment for processing cardless transactions at automated teller devices in accordance with one or more example embodiments. For example, computing environment 300 may include an administrative computer system 320, a first automated teller device 330, a second automated teller device 340, a first customer mobile device 350, and a second customer mobile device 360. Administrative computer system 320 may, for example, be used by and/or configured to be used by an administrative user of an organization, such as an administrative user of a financial institution and/or an administrative user of a particular business unit of a financial institution. Automated teller device 330 may, for example, be an automated teller device, such as an automated teller machine or an automated teller assistant, which may be owned by, operated by, maintained by, and/or otherwise associated with a financial institution and/or which may be capable of and/or configured to allow one or more customers of the financial institution to withdraw funds, make deposits, view account balance information, and/or otherwise interact with and/or control their financial accounts and/or financial account information (which may, e.g., be maintained by the financial institution). Automated teller device 340 may, for example, be another automated teller device, such as an automated teller machine or an automated teller assistant, which may be owned by, operated by, maintained by, and/or otherwise associated with the financial institution and/or which also may be capable of and/or configured to allow one or more customers of the financial institution to withdraw funds, make deposits, view account balance information, and/or otherwise interact with and/or control their financial accounts and/or financial account information (which may, e.g., be maintained by the financial institution). Customer mobile device 350 may, for example, be a mobile computing device, such as a smart phone, tablet computer, or the like, that is used by and/or configured to be used by a first customer of a financial institution. Customer mobile device 360 may, for example, be another mobile computing device, such as a smart phone, tablet computer, or the like, that is used by and/or configured to be used by a second customer of a financial institution (e.g., different from the first customer of the financial institution).

In one or more arrangements, administrative computer system 320, automated teller device 330, automated teller device 340, customer mobile device 350, and customer mobile device 360 may be any type of computing device capable of receiving a user interface, receiving input via the user interface, and communicating the received input to one or more other computing devices. For example, administrative computer system 320, automated teller device 330, automated teller device 340, customer mobile device 350, and customer mobile device 360 may, in some instances, be and/or include a server computer, a desktop computer, laptop computer, tablet computer, smart phone, or the like. As noted above, and as illustrated in greater detail below, any and/or all of administrative computer system 320, automated teller device 330, automated teller device 340, customer mobile device 350, and customer mobile device 360 may, in some instances, be special-purpose computing devices configured to perform specific functions.

Computing environment 300 also may include one or more computing platforms. For example, computing environment 300 may include account management computing platform 310. Account management computing platform 310 may include one or more computing devices configured to perform one or more of the functions described herein. For example, account management computing platform 310 may include one or more computers (e.g., laptop computers, desktop computers, servers, server blades, or the like).

Computing environment 300 also may include one or more networks, which may interconnect one or more of account management computing platform 310, administrative computer system 320, automated teller device 330, automated teller device 340, customer mobile device 350, and customer mobile device 360. For example, computing environment 300 may include organization network 370 and public network 380. Organization network 370 and/or public network 380 may include one or more sub-networks (e.g., LANs, WANs, or the like). Organization network 370 may be associated with a particular organization (e.g., a corporation, financial institution, educational institution, governmental institution, or the like) and may interconnect one or more computing devices associated with the organization. For example, account management computing platform 310, administrative computer system 320, automated teller device 330, and automated teller device 340 may be associated with an organization (e.g., a financial institution), and organization network 370 may be associated with and/or operated by the organization, and may include one or more networks (e.g., LANs, WANs, VPNs, or the like) that interconnect account management computing platform 310, administrative computer system 320, automated teller device 330, and automated teller device 340 and one or more other computing devices and/or computer systems that are used by, operated by, and/or otherwise associated with the organization. Public network 380 may connect organization network 370 and/or one or more computing devices connected thereto (e.g., account management computing platform 310, administrative computer system 320, automated teller device 330, and automated teller device 340) with one or more networks and/or computing devices that are not associated with the organization. For example, customer mobile device 350 and customer mobile device 360 might not be associated with an organization that operates organization network 370 (e.g., because customer mobile device 350 and customer mobile device 360 may be owned and/or operated by one or more entities different from the organization that operates organization network 370, such as one or more customers of the organization, rather than being owned and/or operated by the organization itself or an employee or affiliate of the organization), and public network 380 may include one or more networks (e.g., the internet) that connect customer mobile device 350 and customer mobile device 360 to organization network 370 and/or one or more computing devices connected thereto (e.g., account management computing platform 310, administrative computer system 320, automated teller device 330, and automated teller device 340).

Account management computing platform 310 may include one or more processors 311, memory 312, and communication interface 316. A data bus may interconnect processor(s) 311, memory 312, and communication interface 316. Communication interface 316 may be a network interface configured to support communication between account management computing platform 310 and organization network 370 and/or one or more sub-networks thereof. Memory 312 may include one or more program modules having instructions that when executed by processor(s) 311 cause account management computing platform 310 to perform one or more functions described herein and/or one or more databases that may store and/or otherwise maintain information which may be used by such program modules and/or processor(s) 311. For example, memory 312 may include an account management module 313, which may include instructions that when executed by processor(s) 311 cause account management computing platform 310 to perform one or more functions described herein, such as instructions for processing cardless transactions at automated teller devices, as illustrated in greater detail below. In addition, memory 312 may include a user database 314, which may store user information identifying one or more valid online banking credentials of one or more customers of the financial institution, such as information identifying one or more valid usernames, passwords, user preferences, and/or the like. Memory 312 also may include an account database 315, which may store financial account information, such as account balance information, transaction history information, and/or other financial account information of one or more customers of the financial institution.

Figure 4A:
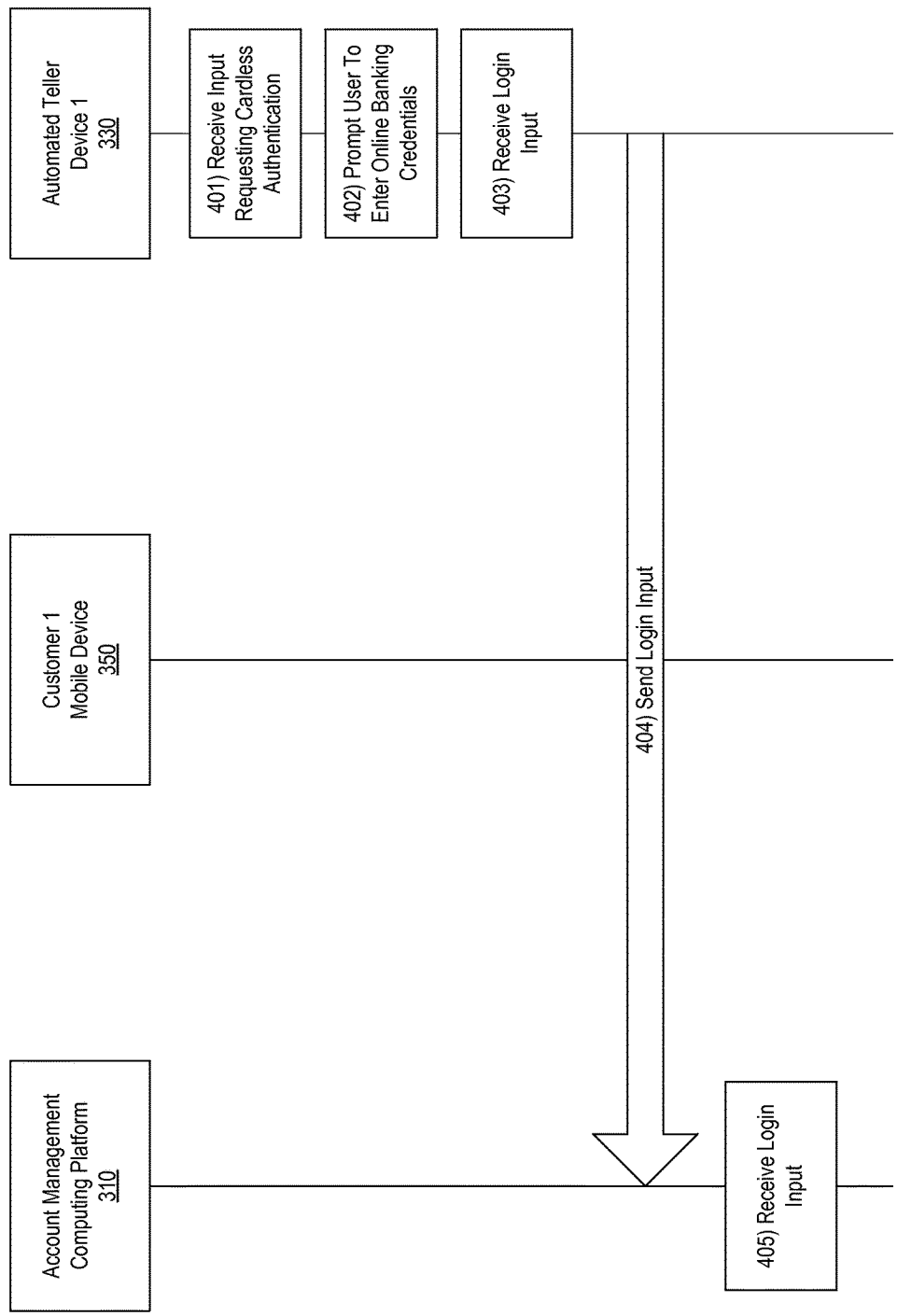

FIGS. 4A-4I depict an illustrative event sequence for processing cardless transactions at automated teller devices in accordance with one or more example embodiments. Referring to FIG. 4A, at step 401, automated teller device 330 may receive input requesting cardless authentication. For example, at step 401, automated teller device 330 may receive input from a user of automated teller device 330 (who may, e.g., be a customer of the financial institution that maintains and/or operates automated teller device 330), and such input may include and/or correspond to a request from the user of automated teller device 330 to authenticate with automated teller device 330 and/or a user account (which may, e.g., be linked to one or more financial accounts maintained by the financial institution operating automated teller device 330) using one or more online banking credentials and/or without using a physical banking card.

Figure 5:
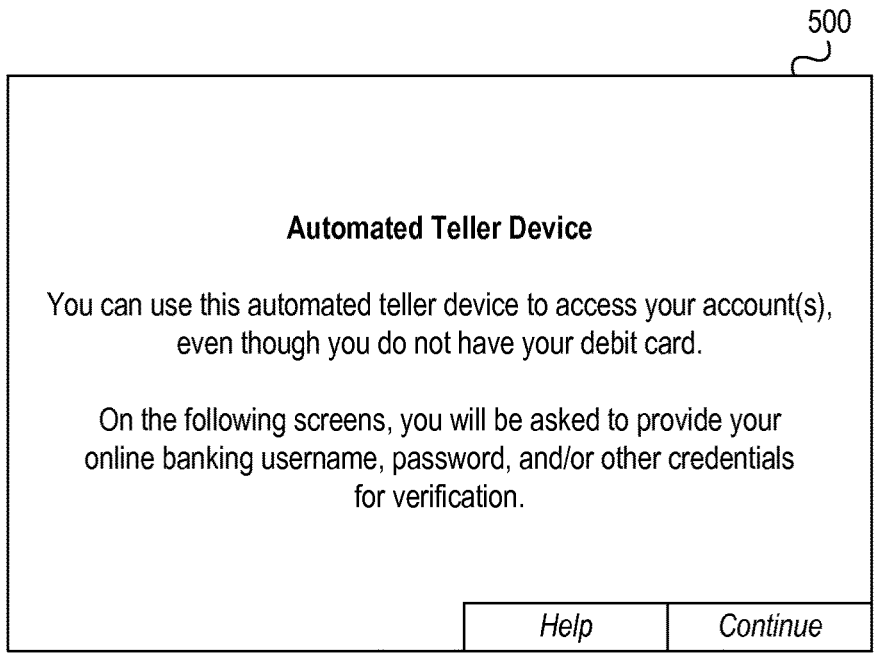
FIGS. 5-10 depict example graphical user interfaces for processing cardless transactions at automated teller devices in accordance with one or more example embodiments.

At step 402, automated teller device 330 may prompt the user of automated teller device 330 to enter one or more online banking credentials. For example, in prompting the user of automated teller device 330 to enter one or more online banking credentials, automated teller device 330 may display, cause to be displayed, and/or otherwise present a graphical user interface similar to graphical user interface 500, which is illustrated in FIG. 5. As seen in FIG. 5, graphical user interface 500 may include text and/or other information providing instructions to the user of automated teller device 330 for authenticating without their physical banking card and explaining how the user of automated teller device 330 may be authenticated using their online banking username, password, and/or other credentials.

At step 403, automated teller device 330 may receive login input. For example, at step 403, automated teller device 330 may receive input from the user of automated teller device 330 that includes one or more online banking credentials, such as an online banking username, password, and/or other credentials. Such input may, for instance, be received by automated teller device 330 via one or more graphical user interfaces presented by automated teller device 330. At step 404, automated teller device 330 may send the login input to account management computing platform 310. For example, at step 404, automated teller device 330 may send the one or more online banking credentials, such as an online banking username, password, and/or other credentials, which were received from the user of automated teller device 330 to account management computing platform 310 for validation and/or other processing.

At step 405, account management computing platform 310 may receive the login input from automated teller device 330. For example, at step 405, account management computing platform 310 may receive, via a communication interface (e.g., communication interface 316), and from an automated teller device (e.g., automated teller device 330) associated with a financial institution, login input comprising one or more online banking credentials associated with a customer of the financial institution. Such login input may, for example, include an online banking username, password, and/or other online banking login credentials that may be assigned to and/or otherwise associated with the particular customer of the financial institution (who may, e.g., be using automated teller device 330).

In some embodiments, the automated teller device associated with the financial institution may be an automated teller machine. For example, the automated teller device (e.g., automated teller device 330) from which account management computing platform 310 receives the login input may, in some instances, be an automated teller machine that is a fully automated computing device that enable customers of the financial institution operating account management computing platform 310 to view their account balance information, deposit checks and/or cash into their financial accounts, withdraw funds from their financial accounts, transfer funds between financial accounts, and/or utilize other functions that may be available and/or enabled by the financial institution operating account management computing platform 310.

In some embodiments, the automated teller device associated with the financial institution may be an automated teller assistant. For example, the automated teller device (e.g., automated teller device 330) from which account management computing platform 310 receives the login input may, in some instances, be an automated teller assistance that provides similar functionality as an automated teller machine and further provides teleconferencing functionality that enables the customer of the financial institution (who may, e.g., be using automated teller device 330) to video chat with a bank teller of the financial institution (who may, e.g., be located in a customer service center remote from automated teller device 330).

Figure 4B:
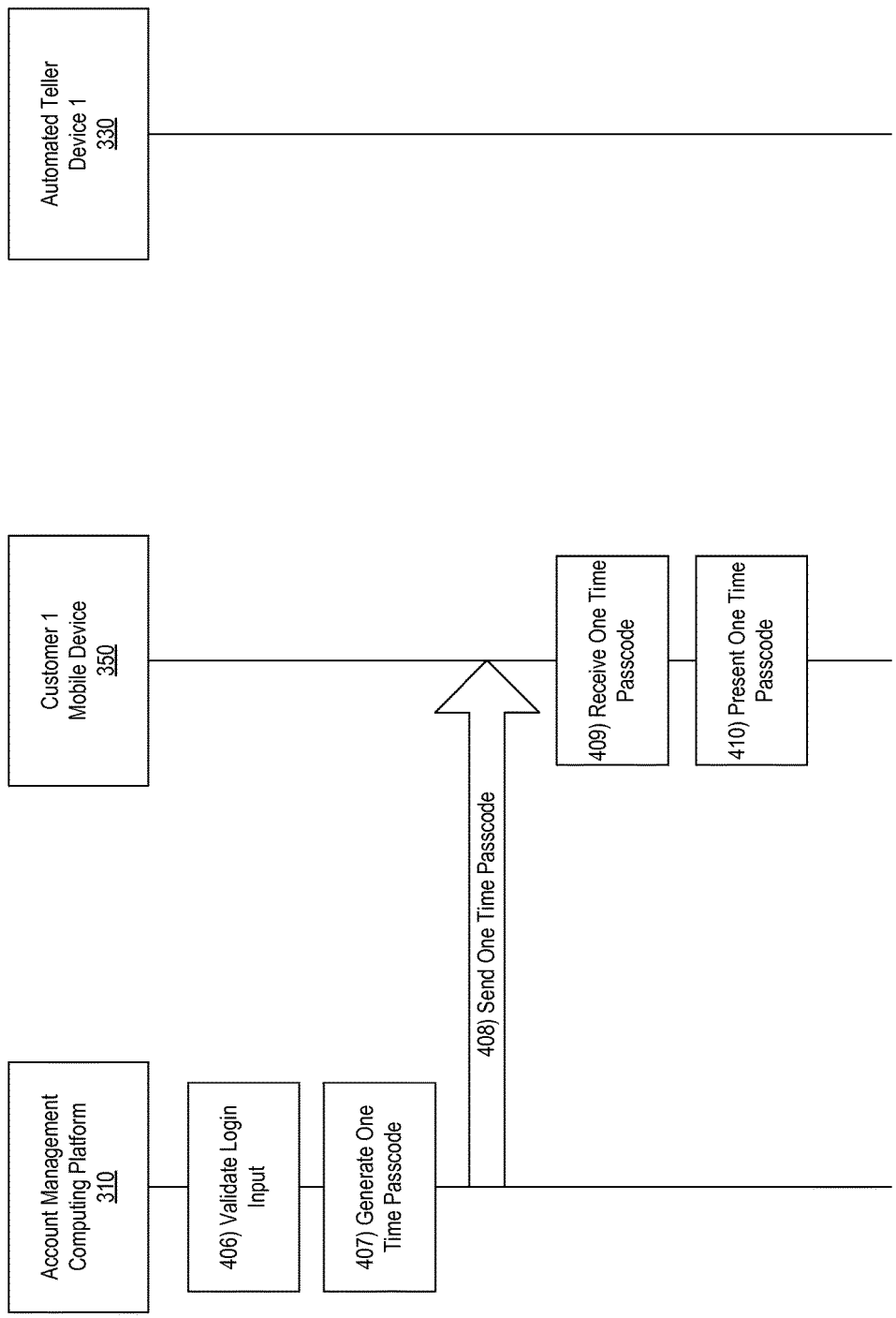

Referring to FIG. 4B, at step 406, account management computing platform 310 may validate the login input received from automated teller device 330. For example, at step 406, account management computing platform 310 may validate the login input including the one or more online banking credentials associated with the customer of the financial institution. In validating the login input, account management computing platform 310 may, for example, match, compare, and/or otherwise evaluate the login input and/or the one or more online banking credentials included in the login input with information defining one or more valid online banking credentials (which may, e.g., be stored and/or otherwise maintained by account management computing platform 310 in user database 314).

In some embodiments, if the login input comprising the one or more online banking credentials associated with the customer of the financial institution is not valid, account management computing platform 310 may send, via the communication interface (e.g., communication interface 316), and to the automated teller device associated with the financial institution (e.g., automated teller device 330), an error message.

Alternatively, if the login input is valid (e.g., at step 406), account management computing platform 310 may, at step 407, generate a one-time passcode. For example, if the login input comprising the one or more online banking credentials associated with the customer of the financial institution is valid, account management computing platform 310 may generate a one-time passcode. Such a one-time passcode may, for instance, be and/or include a string of alphanumeric characters, and account management computing platform 310 may generate the one-time passcode using a one-time passcode generation algorithm, which may, for instance, output the string of alphanumeric characters that represents the passcode as a function of a code generation key and a current time value and/or a current counter value.

At step 408, account management computing platform 310 may send the one-time passcode to customer mobile device 350. For example, at step 408, account management computing platform 310 may send, via the communication interface (e.g., communication interface 316), and to a customer mobile device associated with the customer of the financial institution (e.g., customer mobile device 350), the one-time passcode. For instance, customer mobile device 350 may be registered as belonging to a particular customer of the financial institution who corresponds to a particular username included in the online banking credentials received by account management computing platform 310, and based on receiving the particular username included in the online banking credentials, account management computing platform 310 may identify customer mobile device 350 as being associated with the particular customer and/or otherwise determine to send the one-time passcode to customer mobile device 350 (e.g., based on customer mobile device 350 being associated with the one or more financial accounts to which the user of automated teller device 330 has requested access). In sending the one-time passcode to customer mobile device 350, account management computing platform 310 may, for instance, send one or more email messages to customer mobile device 350, one or more text messages to customer mobile device 350, and/or one or more other messages to customer mobile device 350. In some instances, account management computing platform 310 may cause one or more push notifications to be sent to customer mobile device 350 via a push notification service, and such push notifications may include the one-time passcode.

Figure 6:
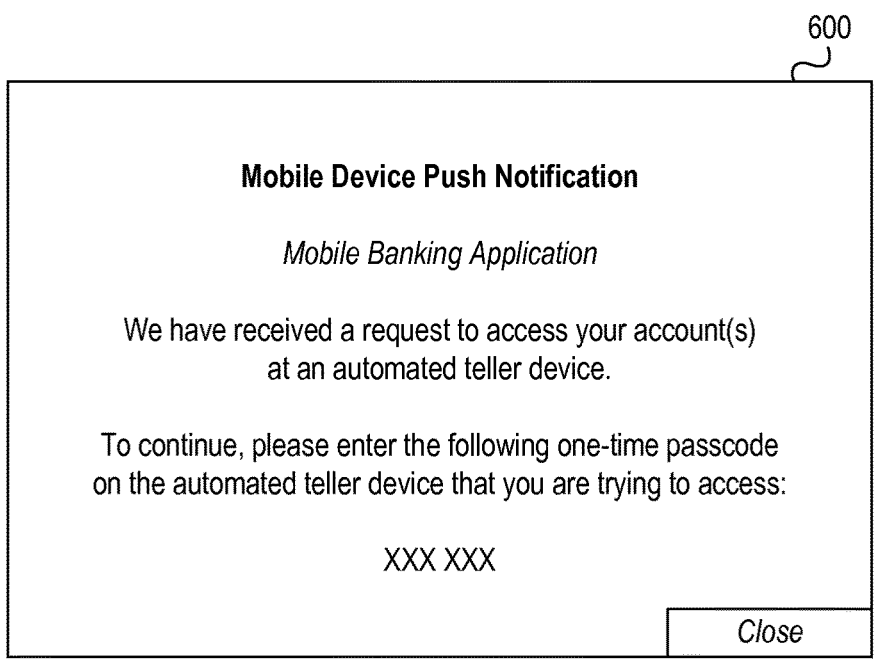

At step 409, customer mobile device 350 may receive the one-time passcode from account management computing platform 310. At step 410, customer mobile device 350 may present the one-time passcode. For example, in presenting the one-time passcode, customer mobile device 350 may display, cause to be displayed, and/or otherwise present a graphical user interface similar to graphical user interface 600, which is illustrated in FIG. 6. As seen in FIG. 6, graphical user interface 600 may include text and/or other information informing the user of customer mobile device 350 that a request has been received at a particular automated teller device to access one or more financial accounts associated with the user of customer mobile device 350, presenting the one-time passcode for use by the user of customer mobile device 350, and/or instructing the user of customer mobile device 350 to enter the one-time passcode on the automated teller device to authenticate at the automated teller device.

Figure 4C:
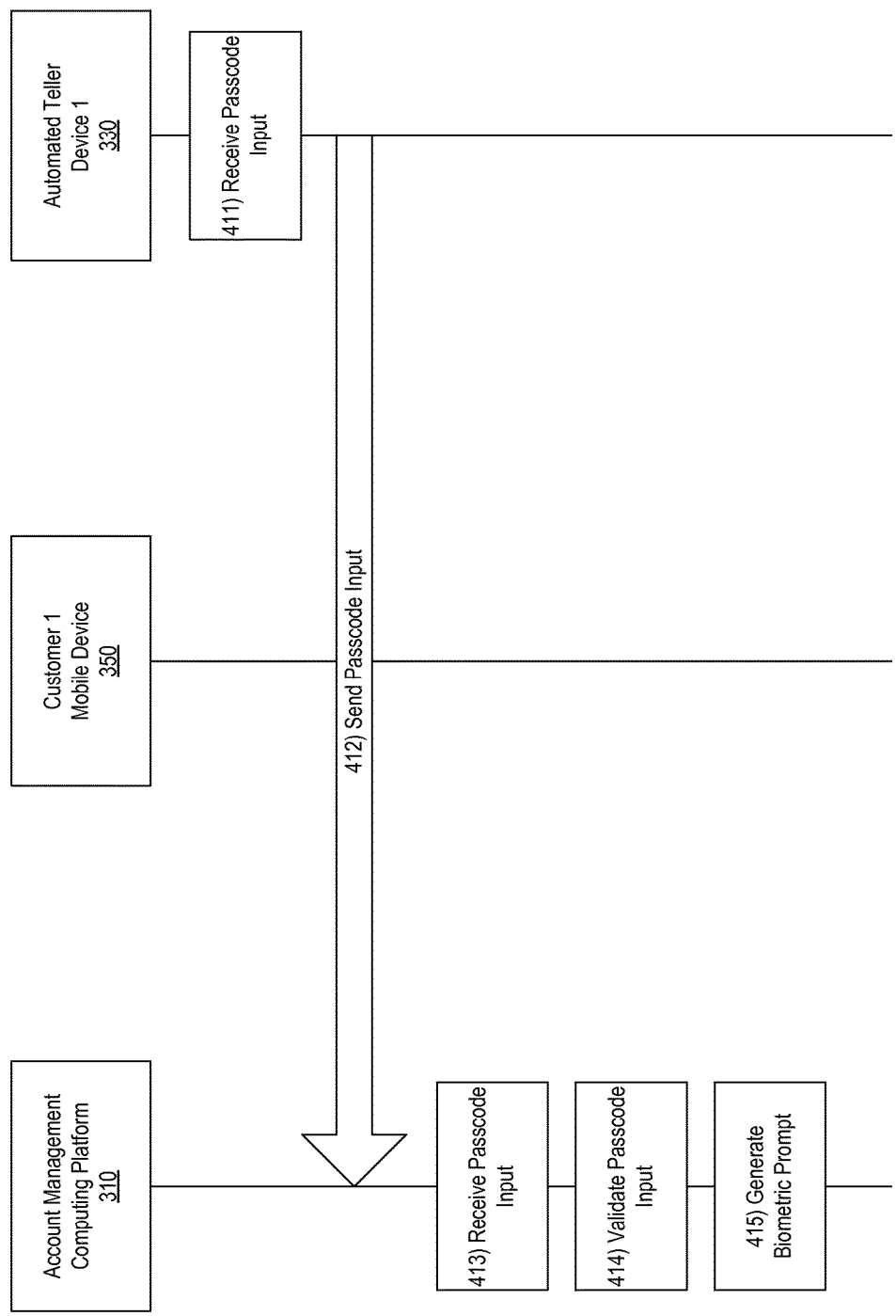

Referring to FIG. 4C, at step 411, automated teller device 330 may receive passcode input. For example, at step 411, automated teller device 330 may receive input from the user of automated teller device 330 (who may, e.g., also be the user of customer mobile device 350, after the user of customer mobile device 350 has viewed the one-time passcode presented by customer mobile device 350). The input received by automated teller device 330 at step 411 may, for instance, include the one-time passcode sent to customer mobile device 350 by account management computing platform 310 (which may, e.g., enable account management computing platform 310 to confirm that the request to authenticate at automated teller device 330 has been submitted by an authorized user of the financial account(s) as they are also in possession of a registered mobile device linked to such account(s), namely, customer mobile device 350). Such passcode input may, for instance, be received by automated teller device 330 via one or more graphical user interfaces presented by automated teller device 330. At step 412, automated teller device 330 may send the passcode input to account management computing platform 310.

At step 413, account management computing platform 310 may receive the passcode input from automated teller device 330. For example, at step 413, account management computing platform 310 may receive, via the communication interface (e.g., communication interface 316), and from the automated teller device associated with the financial institution (e.g., automated teller device 330), passcode input. The passcode input may, for instance, include and/or correspond to a string of characters entered by the user of automated teller device 330 after being prompted to enter a one-time passcode.

At step 414, account management computing platform 310 may validate the passcode input. For example, at step 414, account management computing platform 310 may validate the passcode input received from automated teller device 330. In validating the passcode input, account management computing platform 310 may, for instance, compare the passcode input received from automated teller device 330 with the one-time passcode that was generated and sent to customer mobile device 350; if the passcode input matches the one-time passcode, then account management computing platform 310 may determine that the passcode input is valid, and if the passcode input does not match the one-time passcode, then account management computing platform 310 may determine that the passcode input is not valid. If the passcode input is not valid, account management computing platform 310 may send, via the communication interface (e.g., communication interface 316), and to the automated teller device associated with the financial institution (e.g., automated teller device 330), an error message. If the passcode input is valid (e.g., at step 414), account management computing platform 310 may, at step 415, generate a biometric authentication prompt. For example, if the passcode input is valid, then at step 415, account management computing platform 310 may generate a biometric authentication prompt. Such a biometric authentication prompt may, for example, be configured to prompt a recipient of the prompt (e.g., the user of customer mobile device 350) to provide biometric input for verification, such as fingerprint biometric input, voice biometric input, face and/or eye scan biometric input, and/or the like.

Referring to FIG. 4D, at step 416, account management computing platform 310 may send the biometric authentication prompt to customer mobile device 350. For example, at step 416, account management computing platform 310 may send, via the communication interface (e.g., communication interface 316), and to the customer mobile device (e.g., customer mobile device 350) associated with the customer of the financial institution, the biometric authentication prompt. In sending the biometric authentication prompt to customer mobile device 350, account management computing platform 310 may, for instance, send one or more email messages to customer mobile device 350, one or more text messages to customer mobile device 350, and/or one or more other messages to customer mobile device 350 that may, for instance, include the biometric authentication prompt and/or information associated with biometric authentication prompt. In some instances, account management computing platform 310 may cause one or more push notifications to be sent to customer mobile device 350 via a push notification service, and such push notifications may include the biometric authentication prompt.

At step 417, customer mobile device 350 may receive the biometric authentication prompt from account management computing platform 310. At step 418, customer mobile device 350 may present the biometric authentication prompt. In presenting the biometric authentication prompt, customer mobile device 350 may, for instance, display and/or otherwise present one or more graphical user interfaces prompting the user of customer mobile device 350 to provide one or more types of biometric input for verification by customer mobile device 350, such as fingerprint biometric input, voice biometric input, face and/or eye scan biometric input, and/or the like. At step 419, customer mobile device 350 may receive biometric input (e.g., via a fingerprint scanner connected to and/or included in customer mobile device 350, via a microphone connected to and/or included in customer mobile device 350, via a camera connected to and/or included in customer mobile device 350, and/or via one or more other sensors connected to and/or included in customer mobile device 350).

Figure 4E:
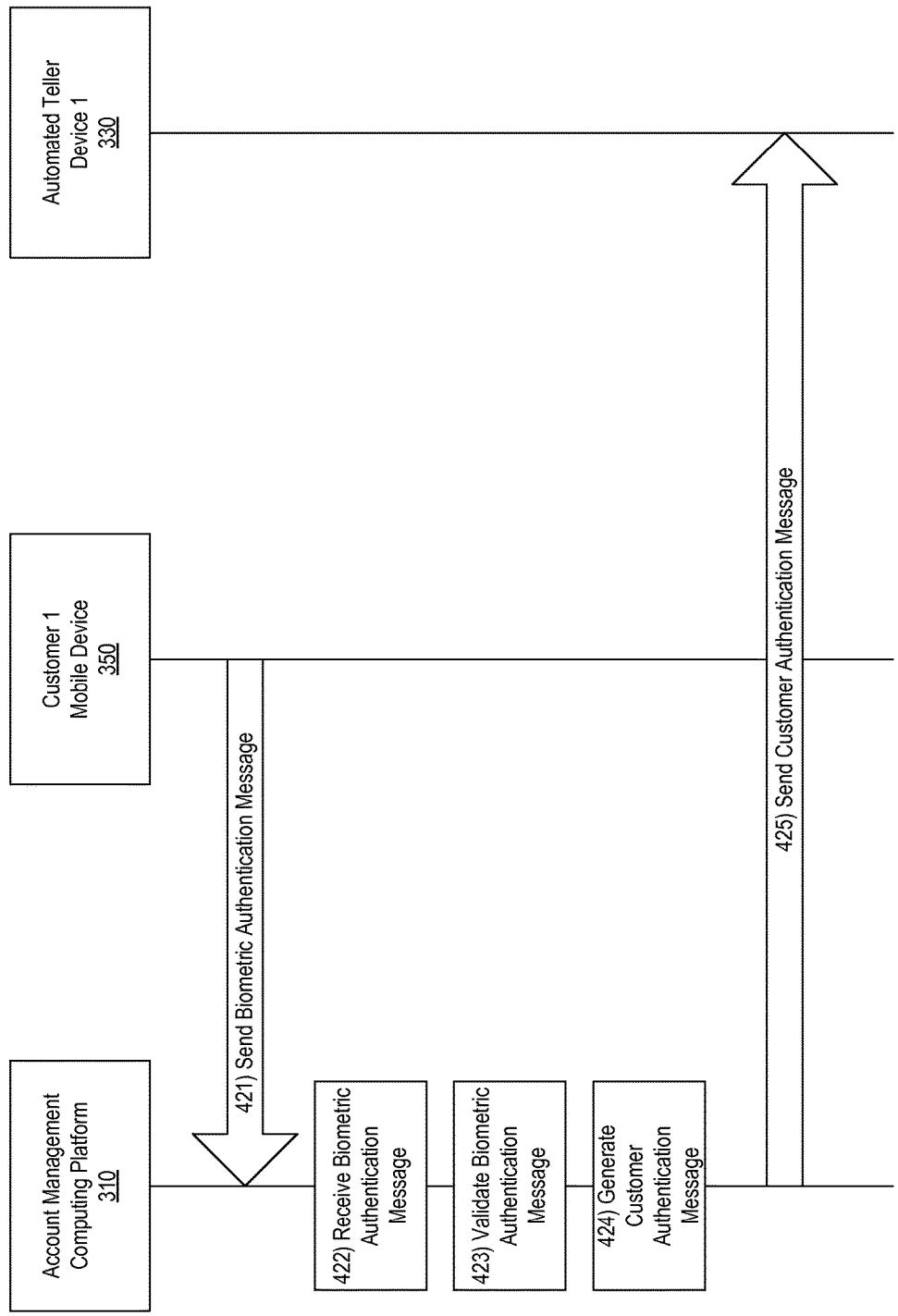

At step 420, customer mobile device 350 may validate the biometric input (e.g., by comparing, matching, and/or otherwise evaluating the biometric input based on information defining one or more valid biometrics for one or more authorized users of customer mobile device 350). If the biometric input is not valid, customer mobile device 350 may generate and/or send one or more error messages to account management computing platform 310 and/or may present one or more error messages to the user of customer mobile device 350. Referring to FIG. 4E, if the biometric input is valid (e.g., at step 420), customer mobile device 350 may, at step 421, send a biometric authentication message to account management computing platform 310. Such a biometric authentication message may, for instance, indicate that the biometric input received by customer mobile device 350 was determined to be valid by customer mobile device 350 (e.g., based on such biometric input matching one or more valid biometric credentials of one or more authorized users of customer mobile device 350).

At step 422, account management computing platform 310 may receive the biometric authentication message from customer mobile device 350. For example, at step 422, account management computing platform 310 may receive, via the communication interface (e.g., communication interface 316), and from the customer mobile device (e.g., customer mobile device 350) associated with the customer of the financial institution, a biometric authentication message indicating that a user of the customer mobile device (e.g., customer mobile device 350) associated with the customer of the financial institution has been biometrically authenticated. At step 423, account management computing platform 310 may validate the biometric authentication message. In validating the biometric authentication message, account management computing platform 310 may, for example, confirm based on one or more records maintained by account management computing platform 310 in user database 314 that the customer associated with customer mobile device 350 has registered for and/or otherwise enabled biometric login services for automated teller devices. If account management computing platform 310 determines that the biometric authentication message is not valid, account management computing platform 310 may, for example, generate and/or send one or more error messages to customer mobile device 350 and/or automated teller device 330. Alternatively, if the biometric authentication message is valid (e.g., at step 423), account management computing platform 310 may, at step 424, generate a customer authentication message. For example, at step 424, account management computing platform 310 may generate a customer authentication message configured to cause the automated teller device associated with the financial institution (e.g., automated teller device 330) to present one or more automated teller user interfaces to a user of the automated teller device associated with the financial institution (e.g., automated teller device 330).

In some embodiments, the one or more automated teller user interfaces may be configured to provide limited access to one or more financial accounts of the customer of the financial institution. For example, the one or more automated teller user interfaces (which may, e.g., be presented by automated teller device 330 based on the customer authentication message generated by account management computing platform 310) may provide only limited access to one or more financial accounts of the customer of the financial institution (e.g., and not full access to such financial accounts). For instance, in providing such limited access, the one or more automated teller user interfaces may allow the user of automated teller device 330 to deposit funds but not withdraw funds, or may allow the user of automated teller device 330 to withdraw funds but only up to a predetermined limit amount, or may allow the user of automated teller device 330 to view account balance information and transaction history information but not withdraw funds, or the like.

In some embodiments, the customer authentication message may be configured to cause the automated teller device associated with the financial institution to present the one or more automated teller user interfaces to the user of the automated teller device associated with the financial institution irrespective of the automated teller device associated with the financial institution receiving a physical banking card from the user of the automated teller device associated with the financial institution. For example, the customer authentication message (which may, e.g., be generated by account management computing platform 310) may be configured to cause automated teller device 330 to present the one or more automated teller user interfaces to the user of automated teller device 330 irrespective of automated teller device 330 receiving a physical banking card from the user of automated teller device 330. For instance, automated teller device 330 may present such user interfaces even without receiving a physical banking card or other physical token from the user of automated teller device 330 (e.g., and instead may present such user interfaces based on the user of automated teller device 330 providing his or her online banking credentials).

In some embodiments, the customer authentication message may be configured to cause the automated teller device associated with the financial institution to present the one or more automated teller user interfaces to the user of the automated teller device associated with the financial institution irrespective of the automated teller device associated with the financial institution receiving a personal identification number (PIN) from the user of the automated teller device associated with the financial institution. For example, the customer authentication message may be configured to cause automated teller device 330 to present the one or more automated teller user interfaces to the user of automated teller device 330 irrespective of automated teller device 330 receiving a personal identification number (PIN) from the user of automated teller device 330. For instance, automated teller device 330 may present such user interfaces even without receiving a PIN from the user of automated teller device 330 (e.g., and instead may present such user interfaces based on the user of automated teller device 330 providing his or her online banking credentials).

At step 425, account management computing platform 310 may send the customer authentication message to automated teller device 330. For example, at step 425, account management computing platform 310 may send, via the communication interface (e.g., communication interface 316), and to the automated teller device associated with the financial institution (e.g., automated teller device 330), the customer authentication message.

Figure 4F:
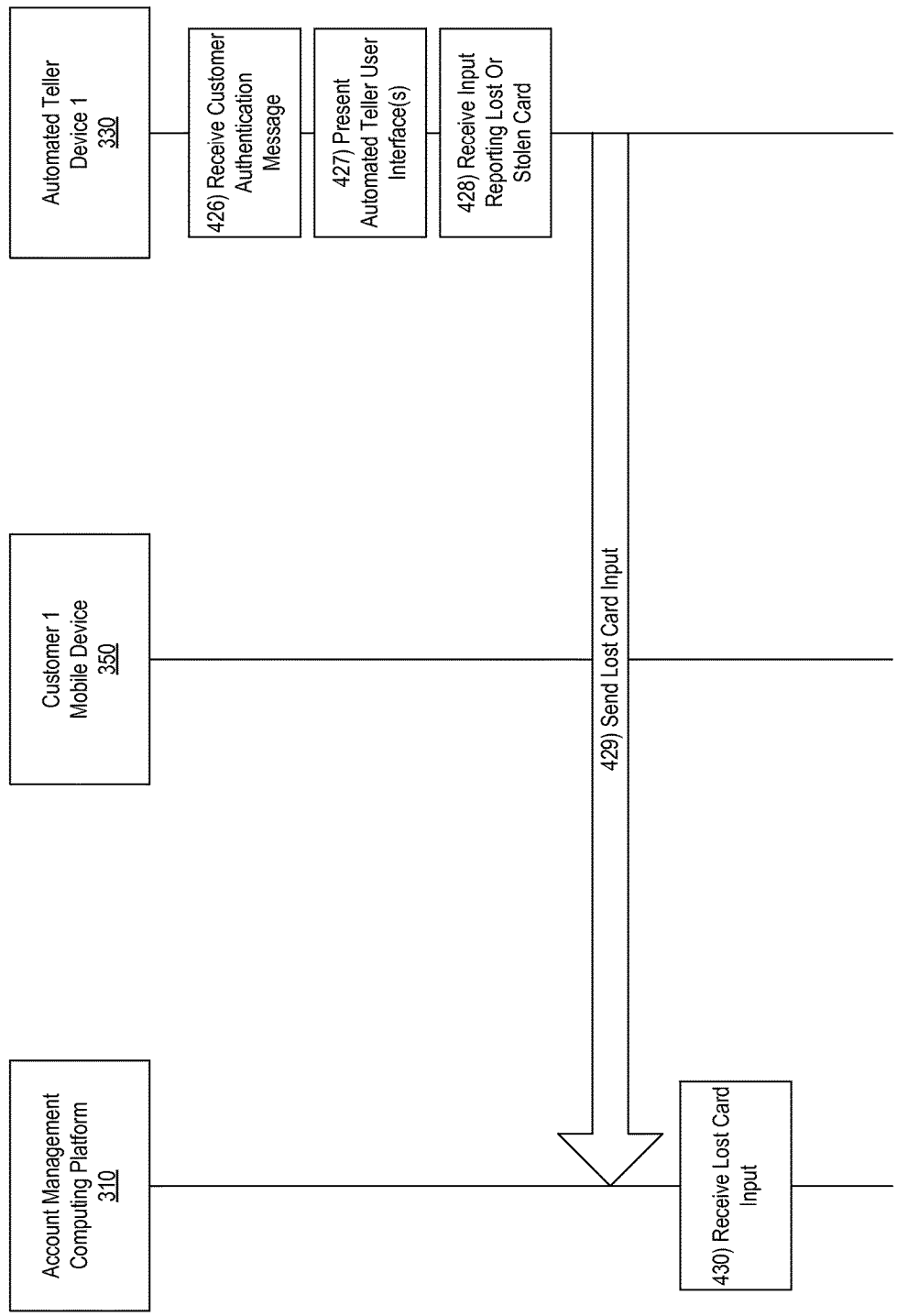
Figure 7:
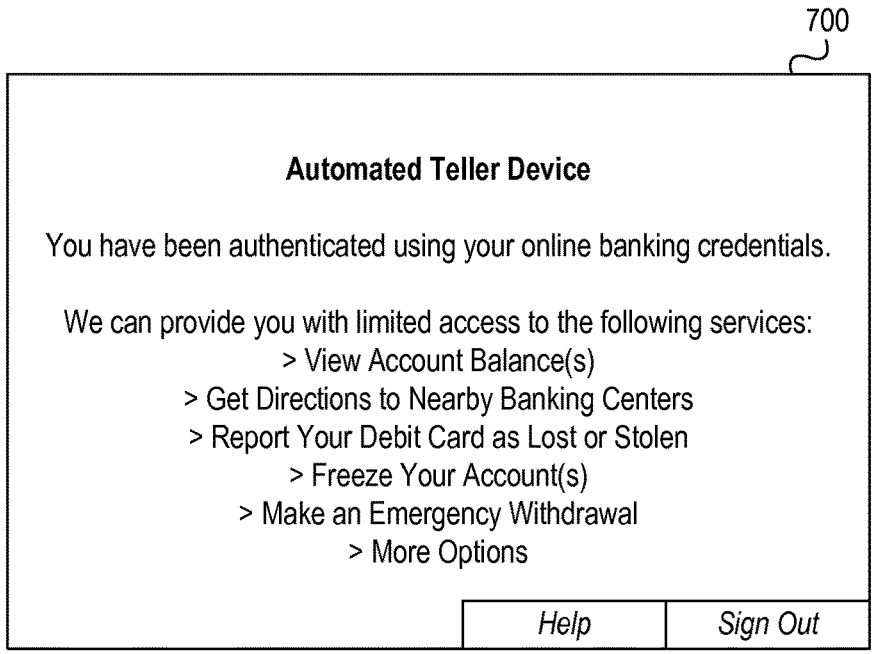

Referring to FIG. 4F, at step 426, automated teller device 330 may receive the customer authentication message from account management computing platform 310. At step 427, automated teller device 330 may present one or more automated teller user interfaces. For example, at step 427, automated teller device 330 may present one or more automated teller user interfaces based on the customer authentication message received from account management computing platform 310, and such user interfaces may provide only limited access to one or more financial accounts and/or other information associated with the customer of the financial institution (who may, e.g., be using automated teller device 330 and/or customer mobile device 350). For instance, in presenting one or more automated teller user interfaces based on the customer authentication message, automated teller device 330 may display, cause to be displayed, and/or otherwise present a graphical user interface similar to graphical user interface 700, which is illustrated in FIG. 7. As seen in FIG. 7, graphical user interface 700 may include text and/or other information informing the user of automated teller device 330 that they have been authenticated using their online banking credentials and/or may provide a limited set of functions that the user of automated teller device 330 can perform on automated teller device 330, such as viewing account balances, obtaining directions to one or more nearby banking centers, reporting their banking card(s) as lost or stolen, freezing one or more accounts, making an emergency withdrawal, and/or one or more other options.

Figure 8:
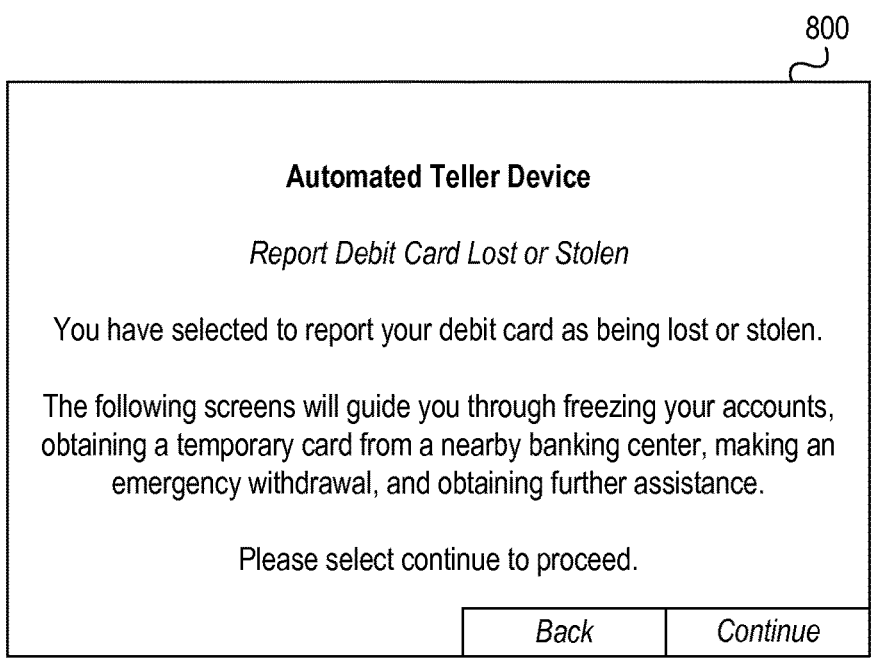

At step 428, automated teller device 330 may receive lost card input reporting a lost or stolen banking card. For example, automated teller device 330 may receive such lost card input via one or more graphical user interfaces presented by automated teller device 330. In receiving such lost card input, automated teller device 330 may display, cause to be displayed, and/or otherwise present a graphical user interface similar to graphical user interface 800, which is illustrated in FIG. 8. As seen in FIG. 8, graphical user interface 800 may include text and/or other information instructing the user on how to report their banking card as lost or stolen and/or providing other controls and/or information enabling the user to report their banking card as lost or stolen.

At step 429, automated teller device 330 may send the lost card input to account management computing platform 310. Such lost card input may, for instance, include information indicating that the user of automated teller device 330 has made one or more selections reporting one or more of their specific banking cards as being lost or stolen. At step 430, account management computing platform 310 may receive the lost card input from automated teller device 330. For example, at step 430, account management computing platform 310 may receive, via the communication interface (e.g., communication interface 316), and from the automated teller device associated with the financial institution (e.g., automated teller device 330), lost-card input indicating that a physical banking card associated with the customer of the financial institution is lost or stolen. Such input may, for instance, include information identifying one or more specific cards that have been lost or stolen, such as one or more card numbers and/or other card identifiers identifying the one or more specific cards that have been lost or stolen.

Figure 4G:
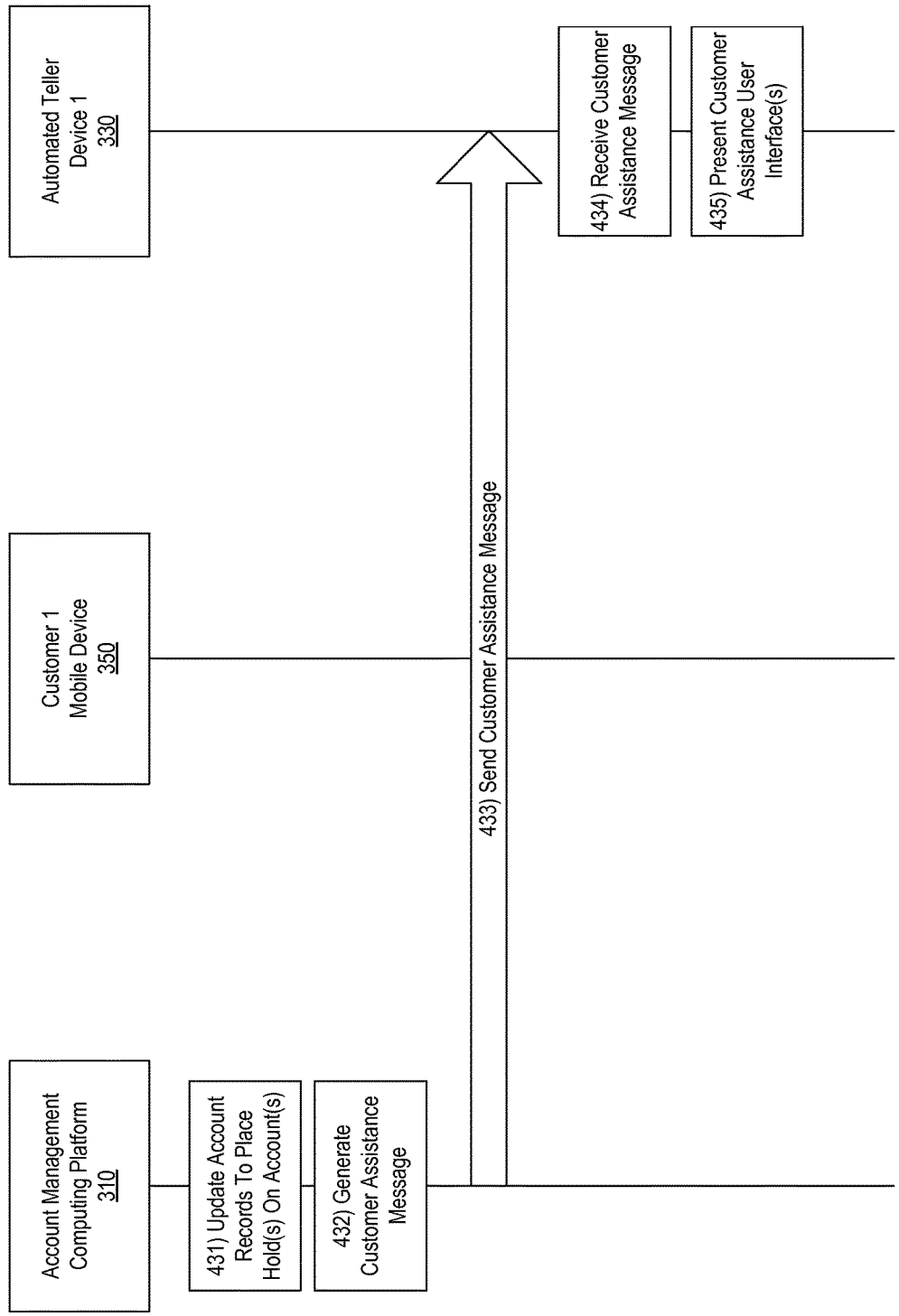

Referring to FIG. 4G, at step 431, account management computing platform 310 may update one or more account records to place one or more holds on one or more accounts. For example, based on receiving the lost-card input indicating that the physical banking card associated with the customer of the financial institution is lost or stolen, account management computing platform 310 may update one or more account records associated with the customer of the financial institution to place one or more holds on one or more accounts associated with the customer of the financial institution. Such holds may, for instance, prevent further transactions from being conducted using the lost or stolen banking card(s) and thus may "freeze" the account(s) corresponding to such cards(s). Although the account(s) may be frozen in this manner, certain types of transactions may be allowed to continue, such as prescheduled transfer transactions, online banking transactions, bill pay transactions, and/or other specific types of transactions. Additionally or alternatively, the one or more holds may be lifted, and the account(s) "unfrozen," using one or more menus presented by the automated teller device (e.g., automated teller device 330), using one or more menus presented via an online banking interface, or by contacting a customer service representative of the financial institution (e.g., after the customer receives and/or activates their new card, if the customer finds their old card, or the like).

At step 432, account management computing platform 310 may generate a customer assistance message. For example, after receiving the lost-card input indicating that the physical banking card associated with the customer of the financial institution is lost or stolen, account management computing platform 310 may generate a customer assistance message configured to cause the automated teller device associated with the financial institution (e.g., automated teller device 330) to present one or more customer assistance user interfaces to the user of the automated teller device associated with the financial institution (e.g., automated teller device 330). Such a customer assistance message may, for instance, include information to assist the customer using automated teller device 330, such as instructions for the customer to obtain assistance from a nearby banking center, directions to a nearby banking center to obtain a temporary banking card (which may, e.g., be determined by account management computing platform 310 based on the location of automated teller device 330), and/or options for obtaining an emergency withdrawal (which may, e.g., be capped at a predetermined monetary amount or at a percentage of an account balance not exceeding a certain threshold, as illustrated in greater detail below).

In some embodiments, the customer assistance message may be configured to cause the automated teller device associated with the financial institution to present, to the user of the automated teller device associated with the financial institution, at least one customer assistance user interface comprising one or more directions from the automated teller device associated with the financial institution to a banking center associated with the financial institution. For example, the customer assistance message (which may, e.g., be generated by account management computing platform 310) may be configured to cause automated teller device 330 to present, to the user of automated teller device 330, at least one customer assistance user interface comprising one or more directions from automated teller device 330 to a banking center associated with the financial institution.

In some embodiments, the customer assistance message may be configured to cause the automated teller device associated with the financial institution to present, to the user of the automated teller device associated with the financial institution, at least one customer assistance user interface comprising at least one option to request an emergency withdrawal. For example, the customer assistance message may be configured to cause automated teller device 330 to present, to the user of automated teller device 330, at least one customer assistance user interface comprising at least one option to request an emergency withdrawal.

At step 433, account management computing platform 310 may send the customer assistance message to automated teller device 330. For example, at step 433, account management computing platform 310 may send, via the communication interface (e.g., communication interface 316), and to the automated teller device associated with the financial institution (e.g., automated teller device 330), the customer assistance message.

Figure 9:
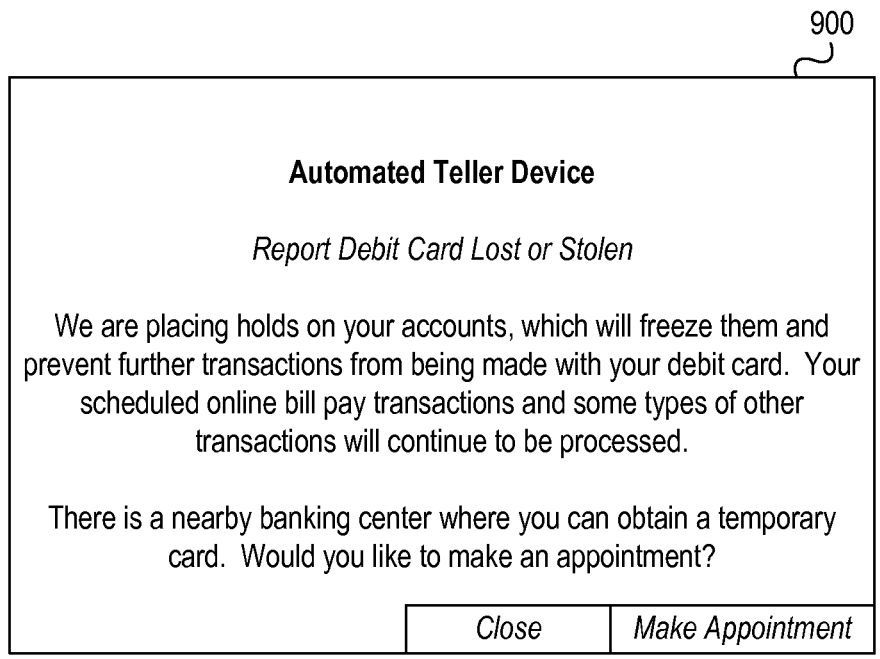
Figure 10:
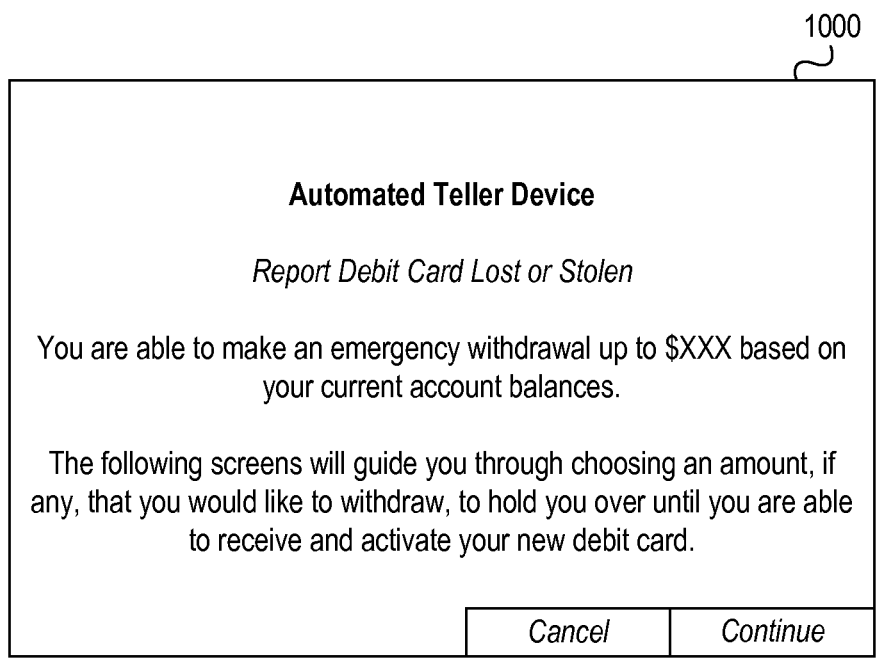

At step 434, automated teller device 330 may receive the customer assistance message from account management computing platform 310. At step 435, automated teller device 330 may present one or more customer assistance user interfaces. For example, at step 435, automated teller device 330 may present one or more customer assistance user interfaces based on the customer assistance message received from account management computing platform 310. In presenting one or more customer assistance user interfaces, automated teller device 330 may, for example, display, cause to be displayed, and/or otherwise present a graphical user interface similar to graphical user interface 900, which is illustrated in FIG. 9. As seen in FIG. 9, graphical user interface 900 may include text and/or other information confirming that the customer's card has been reported as lost or stolen, information the customer using automated teller device 330 that one or more holds have been placed on their financial accounts and/or that certain types of transactions will be prevented while others will be allowed to continue, and/or providing the customer using automated teller device 330 directions to one or more nearby banking centers. Additionally or alternatively, in presenting one or more customer assistance user interfaces, automated teller device 330 may, for example, display, cause to be displayed, and/or otherwise present a graphical user interface similar to graphical user interface 1000, which is illustrated in FIG. 10. As seen in FIG. 10, graphical user interface 1000 may include text and/or other information providing the customer using automated teller device 330 with one or more options to request an emergency withdrawal.

Figure 4H:
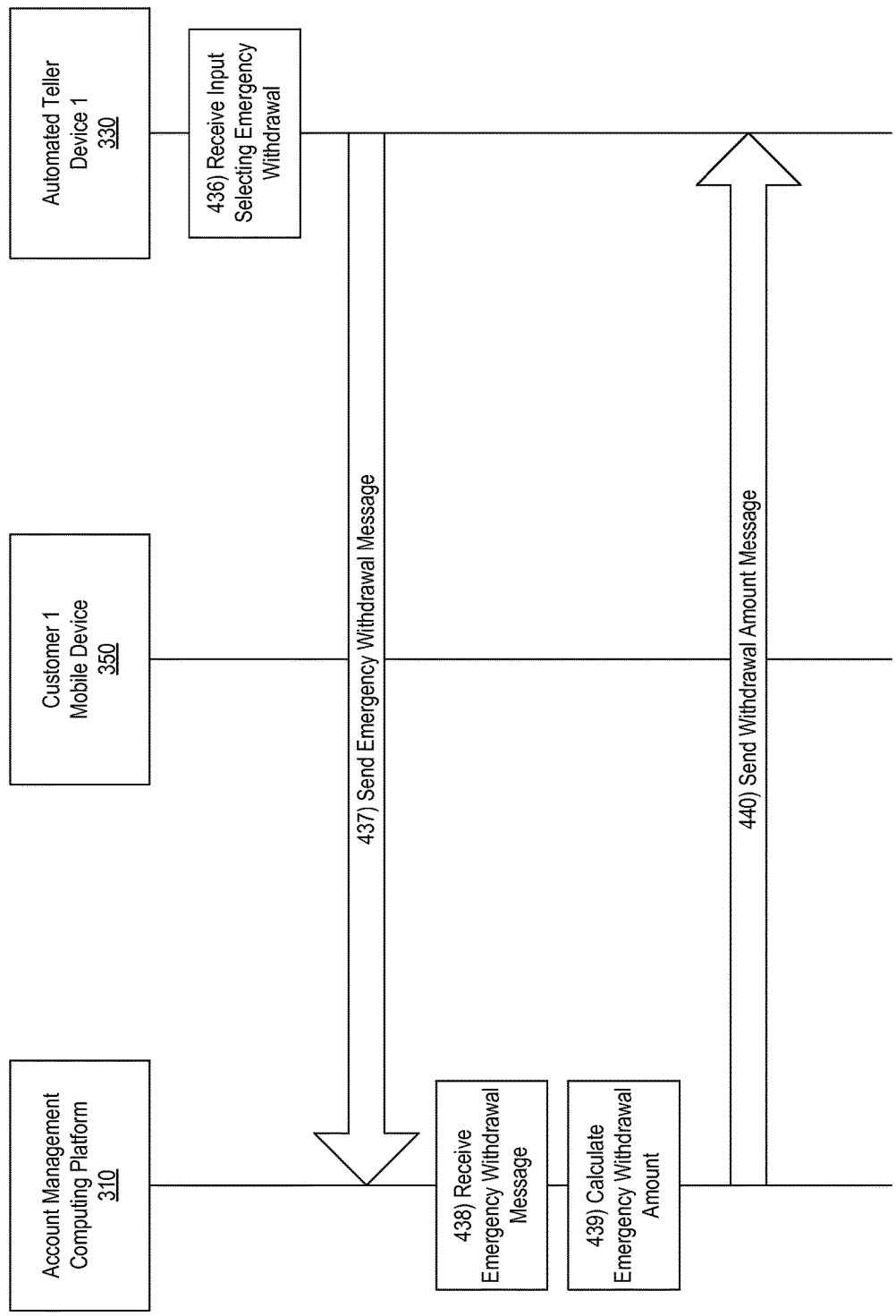

Referring to FIG. 4H, at step 436, automated teller device 330 may receive input selecting an emergency withdrawal. For example, at step 436, automated teller device 330 may receive input from the user of automated teller device 330 requesting to make an emergency withdrawal. Such input may, for instance, be received via one or more graphical user interfaces presented by automated teller device 330. At step 437, automated teller device 330 may send an emergency withdrawal message to account management computing platform 310. At step 438, account management computing platform 310 may receive the emergency withdrawal message from automated teller device 330. For example, after sending the customer assistance message, account management computing platform 310 may receive, via the communication interface (e.g., communication interface 316), and from the automated teller device associated with the financial institution (e.g., automated teller device 330), an emergency withdrawal message that includes a request to make an emergency withdrawal from the automated teller device associated with the financial institution (e.g., automated teller device 330).

At step 439, account management computing platform 310 may calculate an emergency withdrawal amount. In calculating the emergency withdrawal amount (which may, e.g., represent the maximum amount that account management computing platform 310 will allow the user of automated teller device 330 to withdraw having authenticated with only their online banking credentials and/or without providing their banking card), account management computing platform 310 may, for instance, determine that the customer's account balance exceeds a predetermined threshold amount (e.g., $100, $500, or the like), and thus may determine that the emergency withdrawal amount is the predetermined threshold amount (e.g., $100, $500, or the like). If the customer's account balance does not exceed the predetermined threshold amount, account management computing platform 310 may calculate the emergency withdrawal amount as a percentage of the customer's current account balance (e.g., 10%, 20%, or the like), and thus may determine that the emergency withdrawal amount is the percentage of the customer's current account balance. In still other instances, account management computing platform 310 may determine that the emergency withdrawal amount is zero, for instance, if account management computing platform 310 is not able to authorize an emergency withdrawal on the customer's account (e.g., based on the customer's preferences, local rules or regulations, and/or other factors).

At step 440, account management computing platform 310 may send a withdrawal amount message to automated teller device 330. For example, at step 440, account management computing platform 310 may send, via the communication interface (e.g., communication interface 316), and to the automated teller device associated with the financial institution (e.g., automated teller device 330), a withdrawal amount message configured to cause the automated teller device associated with the financial institution (e.g., automated teller device 330) to dispense funds up to the emergency withdrawal amount. For instance, the withdrawal amount message sent by account management computing platform 310 to automated teller device 330 may identify the emergency withdrawal amount calculated by account management computing platform 310.

Figure 4I:
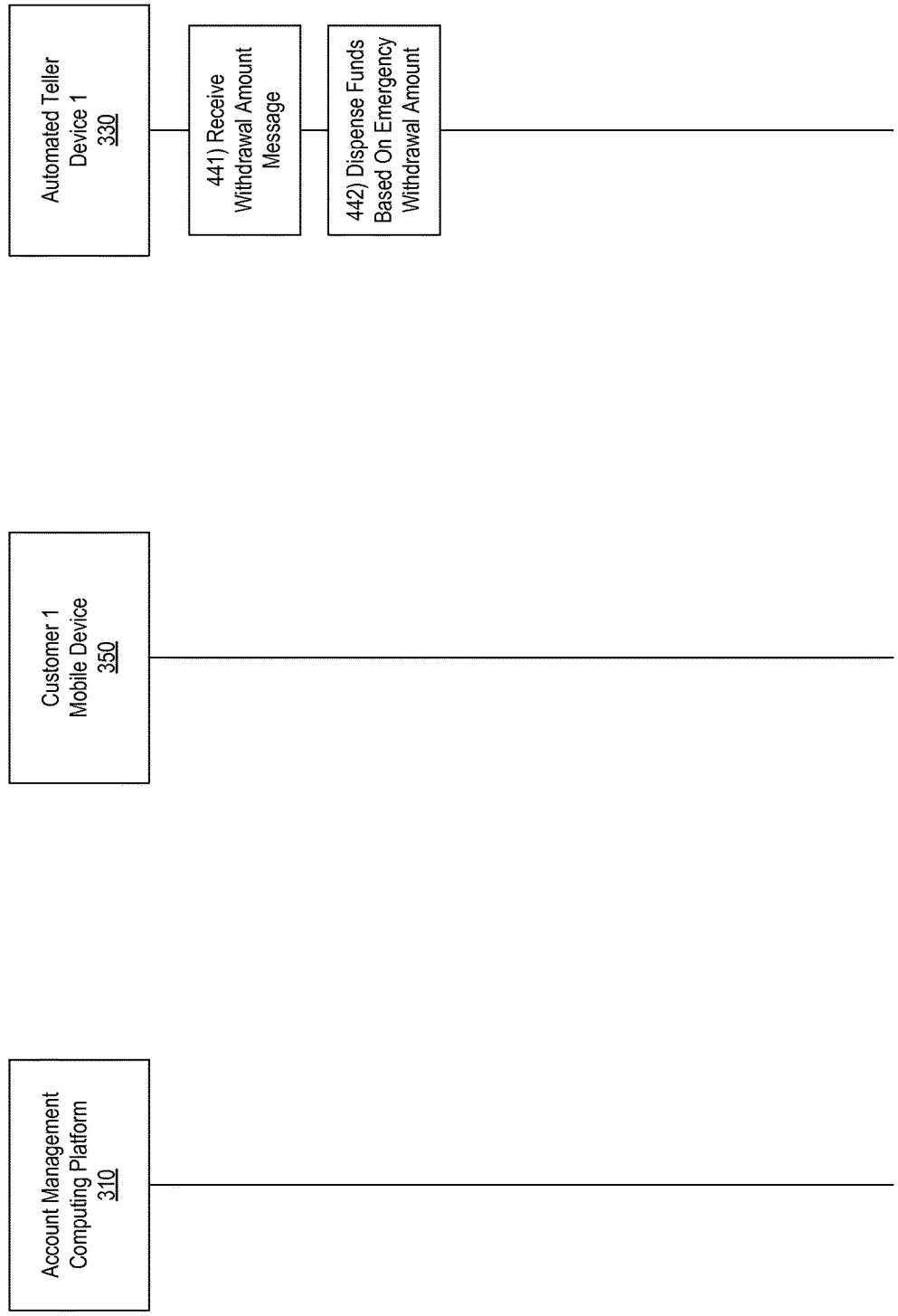

Referring to FIG. 4I, at step 441, automated teller device 330 may receive the withdrawal amount message from account management computing platform 310. At step 442, automated teller device 330 may dispense funds based on the emergency withdrawal amount. For example, in dispensing funds based on the emergency withdrawal amount, automated teller device 330 may allow the customer using automated teller device 330 to specify an amount to be withdrawn that is less than or equal to the emergency withdrawal amount specified in the withdrawal amount message received by automated teller device 330 from account management computing platform 310. Based on the customer's selections, automated teller device 330 may dispense the requested amount of funds and may send one or more messages to account management computing platform 310 that include transaction information reflecting the withdrawal, which account management computing platform 310 may use to update the customer's account balance information, transaction history information, and/or other financial account information.

Figure 11:
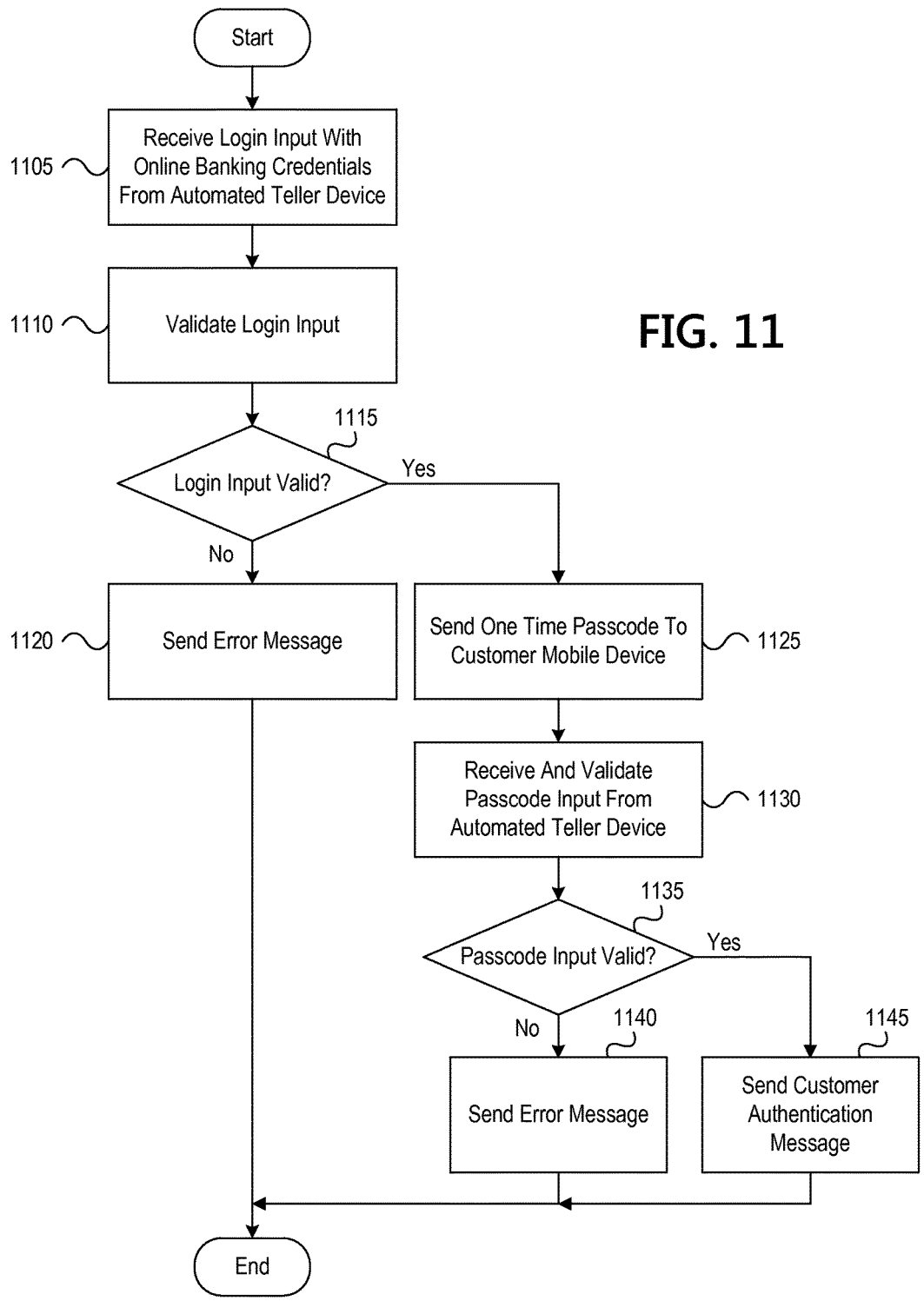
FIG. 11 depicts an illustrative method for processing cardless transactions at automated teller devices in accordance with one or more example embodiments.

FIG. 11 depicts an illustrative method for processing cardless transactions at automated teller devices in accordance with one or more example embodiments. Referring to FIG. 11, at step 1105, a computing platform may receive login input that includes one or more online banking credentials from an automated teller device. At step 1110, the computing platform may validate the login input. At step 1115, the computing platform may determine whether the login input is valid. If the computing platform determines that the login input is not valid, then at step 1120, the computing platform may send an error message to the automated teller device. Alternatively, if the computing platform determines that the login input is valid, then at step 1125, the computing platform may send a one-time passcode to a customer mobile device (which may, e.g., be registered as belonging to and/or otherwise associated with a customer associated with the online banking credentials received from the automated teller device). At step 1130, the computing platform may receive and validate passcode input from the automated teller device. At step 1135, the computing platform may determine whether the passcode input is valid. If the computing platform determines that the passcode input is not valid, then at step 1140, the computing platform may send an error message to the automated teller device. Alternatively, if the computing platform determines that the passcode input is valid, then at step 1145, the computing platform may send to the automated teller device a customer authentication message (which may, e.g., cause the automated teller device to provide the user of the automated teller device with access to financial account information associated with one or more financial accounts linked to the online banking credentials received from the automated teller device).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from an automated teller device associated with a financial institution, login input comprising one or more online banking credentials associated with a customer of the financial institution;
   validate the login input comprising the one or more online banking credentials associated with the customer of the financial institution;
   if the login input comprising the one or more online banking credentials associated with the customer of the financial institution is valid:
   generate a one-time passcode;
   send, via the communication interface, and to a customer mobile device associated with the customer of the financial institution, the one-time passcode;
   receive, via the communication interface, and from the automated teller device associated with the financial institution, passcode input;
   validate the passcode input;
   if the passcode input is valid:
   generate a customer authentication message configured to cause the automated teller device associated with the financial institution to present one or more automated teller user interfaces to a user of the automated teller device associated with the financial institution; and
   send, via the communication interface, and to the automated teller device associated with the financial institution, the customer authentication message,
   wherein sending the customer authentication message to the automated teller device associated with the financial institution causes the automated teller device associated with the financial institution to present the one or more automated teller user interfaces to the user of the automated teller device associated with the financial institution,
   wherein the one or more automated teller user interfaces are configured to provide limited access to one or more financial accounts of the customer of the financial institution by allowing the user of the automated teller device to deposit funds, to view account balance information, and to withdraw funds only up to a predetermined limit amount,
   wherein the customer authentication message is configured to cause the automated teller device associated with the financial institution to present the one or more automated teller user interfaces to the user of the automated teller device associated with the financial institution irrespective of the automated teller device associated with the financial institution receiving a physical banking card from the user of the automated teller device associated with the financial institution, and
   wherein the customer authentication message is configured to cause the automated teller device associated with the financial institution to present the one or more automated teller user interfaces to the user of the automated teller device associated with the financial institution irrespective of the automated teller device associated with the financial institution receiving a personal identification number (PIN) from the user of the automated teller device associated with the financial institution.

2. The system of claim 1, wherein the memory stores additional computer-readable instructions that, when executed by the at least one processor, further cause the system to:
   if the login input comprising the one or more online banking credentials associated with the customer of the financial institution is not valid, send, via the communication interface, and to the automated teller device associated with the financial institution, an error message.

3. The system of claim 1, wherein the memory stores additional computer-readable instructions that, when executed by the at least one processor, further cause the system to:
   if the passcode input is not valid, send, via the communication interface, and to the automated teller device associated with the financial institution, an error message.

4. The system of claim 1, wherein the automated teller device associated with the financial institution comprises an automated teller machine.

5. The system of claim 1, wherein the automated teller device associated with the financial institution comprises an automated teller assistant.

6. The system of claim 1, wherein the memory stores additional computer-readable instructions that, when executed by the at least one processor, further cause the system to:
   if the passcode input is valid, and prior to generating the customer authentication message configured to cause the automated teller device associated with the financial institution to present the one or more automated teller user interfaces to the user of the automated teller device associated with the financial institution:
   generate a biometric authentication prompt;
   send, via the communication interface, and to the customer mobile device associated with the customer of the financial institution, the biometric authentication prompt; and
   receive, via the communication interface, and from the customer mobile device associated with the customer of the financial institution, a biometric authentication message indicating that a user of the customer mobile device associated with the customer of the financial institution has been biometrically authenticated.

7. The system of claim 1, wherein the memory stores additional computer-readable instructions that, when executed by the at least one processor, further cause the system to:
   after sending the customer authentication message:
   receive, via the communication interface, and from the automated teller device associated with the financial institution, lost-card input indicating that a physical banking card associated with the customer of the financial institution is lost or stolen; and
   based on receiving the lost-card input indicating that the physical banking card associated with the customer of the financial institution is lost or stolen, update one or more account records associated with the customer of the financial institution to place one or more holds on one or more accounts associated with the customer of the financial institution.

8. The system of claim 7, wherein the memory stores additional computer-readable instructions that, when executed by the at least one processor, further cause the system to:
   after receiving the lost-card input indicating that the physical banking card associated with the customer of the financial institution is lost or stolen:
   generate a customer assistance message configured to cause the automated teller device associated with the financial institution to present one or more customer assistance user interfaces to the user of the automated teller device associated with the financial institution; and
   send, via the communication interface, and to the automated teller device associated with the financial institution, the customer assistance message.

9. The system of claim 8, wherein the customer assistance message is configured to cause the automated teller device associated with the financial institution to present, to the user of the automated teller device associated with the financial institution, at least one customer assistance user interface comprising one or more directions from the automated teller device associated with the financial institution to a banking center associated with the financial institution.

10. The system of claim 8, wherein the customer assistance message is configured to cause the automated teller device associated with the financial institution to present, to the user of the automated teller device associated with the financial institution, at least one customer assistance user interface comprising at least one option to request an emergency withdrawal.

11. The system of claim 8, wherein the memory stores additional computer-readable instructions that, when executed by the at least one processor, further cause the system to:
   after sending the customer assistance message:
   receive, via the communication interface, and from the automated teller device associated with the financial institution, an emergency withdrawal message comprising a request to make an emergency withdrawal from the automated teller device associated with the financial institution;
   calculate an emergency withdrawal amount; and
   send, via the communication interface, and to the automated teller device associated with the financial institution, a withdrawal amount message configured to cause the automated teller device associated with the financial institution to dispense funds up to the emergency withdrawal amount.

12. A method, comprising:
   at a computing platform comprising at least one processor, memory, and a communication interface:
   receiving, by the at least one processor, via the communication interface, and from an automated teller device associated with a financial institution, login input comprising one or more online banking credentials associated with a customer of the financial institution;
   validating, by the at least one processor, the login input comprising the one or more online banking credentials associated with the customer of the financial institution;
   if the login input comprising the one or more online banking credentials associated with the customer of the financial institution is valid:
   generating, by the at least one processor, a one-time passcode;
   sending, by the at least one processor, via the communication interface, and to a customer mobile device associated with the customer of the financial institution, the one-time passcode;
   receiving, by the at least one processor, via the communication interface, and from the automated teller device associated with the financial institution, passcode input;
   validating, by the at least one processor, the passcode input;
   if the passcode input is valid:
   generating, by the at least one processor, a customer authentication message configured to cause the automated teller device associated with the financial institution to present one or more automated teller user interfaces to a user of the automated teller device associated with the financial institution; and
   sending, by the at least one processor, via the communication interface, and to the automated teller device associated with the financial institution, the customer authentication message, wherein sending the customer authentication message to the automated teller device associated with the financial institution causes the automated teller device associated with the financial institution to present the one or more automated teller user interfaces to the user of the automated teller device associated with the financial institution, wherein the one or more automated teller user interfaces are configured to provide limited access to one or more financial accounts of the customer of the financial institution by allowing the user of the automated teller device to deposit funds, to view account balance information, and to withdraw funds only up to a predetermined limit amount, wherein the customer authentication message is configured to cause the automated teller device associated with the financial institution to present the one or more automated teller user interfaces to the user of the automated teller device associated with the financial institution irrespective of the automated teller device associated with the financial institution receiving a physical banking card from the user of the automated teller device associated with the financial institution, and wherein the customer authentication message is configured to cause the automated teller device associated with the financial institution to present the one or more automated teller user interfaces to the user of the automated teller device associated with the financial institution irrespective of the automated teller device associated with the financial institution receiving a personal identification number (PIN) from the user of the automated teller device associated with the financial institution.

13. The method of claim 12, further comprising:
if the login input comprising the one or more online banking credentials associated with the customer of the financial institution is not valid, sending, by the at least one processor, via the communication interface, and to the automated teller device associated with the financial institution, an error message.

14. The method of claim 12, further comprising:
if the passcode input is not valid, sending, by the at least one processor, via the communication interface, and to the automated teller device associated with the financial institution, an error message.

15. The method of claim 12, further comprising:
after sending the customer authentication message:
 receiving, by the at least one processor, via the communication interface, and from the automated teller device associated with the financial institution, lost-card input indicating that a physical banking card associated with the customer of the financial institution is lost or stolen; and
 based on receiving the lost-card input indicating that the physical banking card associated with the customer of the financial institution is lost or stolen, updating, by the at least one processor, one or more account records associated with the customer of the financial institution to place one or more holds on one or more accounts associated with the customer of the financial institution.

16. The method of claim 15, further comprising:
after receiving the lost-card input indicating that the physical banking card associated with the customer of the financial institution is lost or stolen:

generating, by the at least one processor, a customer assistance message configured to cause the automated teller device associated with the financial institution to present one or more customer assistance user interfaces to the user of the automated teller device associated with the financial institution; and sending, by the at least one processor, via the communication interface, and to the automated teller device associated with the financial institution, the customer assistance message.

17. One or more non-transitory computer-readable media storing instructions that, when executed by a computer system comprising at least one processor, memory, and a communication interface, cause the computer system to:
 receive, via the communication interface, and from an automated teller device associated with a financial institution, login input comprising one or more online banking credentials associated with a customer of the financial institution;
 validate the login input comprising the one or more online banking credentials associated with the customer of the financial institution;
 if the login input comprising the one or more online banking credentials associated with the customer of the financial institution is valid:
 generate a one-time passcode;
 send, via the communication interface, and to a customer mobile device associated with the customer of the financial institution, the one-time passcode;
 receive, via the communication interface, and from the automated teller device associated with the financial institution, passcode input;
 validate the passcode input;
 if the passcode input is valid:
  generate a customer authentication message configured to cause the automated teller device associated with the financial institution to present one or more automated teller user interfaces to a user of the automated teller device associated with the financial institution; and
  send, via the communication interface, and to the automated teller device associated with the financial institution, the customer authentication message,
 wherein sending the customer authentication message to the automated teller device associated with the financial institution causes the automated teller device associated with the financial institution to present the one or more automated teller user interfaces to the user of the automated teller device associated with the financial institution,
 wherein the one or more automated teller user interfaces are configured to provide limited access to one or more financial accounts of the customer of the financial institution by allowing the user of the automated teller device to deposit funds, to view account balance information, and to withdraw funds only up to a predetermined limit amount,
 wherein the customer authentication message is configured to cause the automated teller device associated with the financial institution to present the one or more automated teller user interfaces to the user of the automated teller device associated with the financial institution irrespective of the automated teller device associated with the financial institution receiving a physical banking card from the user of the automated teller device associated with the financial institution, and wherein the customer authentication message is configured to cause the automated teller device associated with the financial institution to present the one or more automated teller user interfaces to the user of the automated teller device associated with the financial institution irrespective of the automated teller device associated with the financial institution receiving a personal identification number (PIN) from the user of the automated teller device associated with the financial institution.

* * * * *